(12) United States Patent
Smith et al.

(10) Patent No.: US 11,622,341 B2
(45) Date of Patent: Apr. 4, 2023

(54) ACTIVE GEO-LOCATION FOR PERSONAL AREA NETWORK DEVICES USING CORRELATION

(71) Applicant: SR Technologies, Inc., Sunrise, FL (US)

(72) Inventors: Graham K. Smith, Boca Raton, FL (US); Joaquin Prendes, Plantation, FL (US); Mark Passler, Boca Raton, FL (US); Nikolaos Glantzis, Coconut Creek, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/723,864

(22) Filed: Apr. 19, 2022

(65) Prior Publication Data

US 2022/0361138 A1    Nov. 10, 2022

Related U.S. Application Data

(60) Provisional application No. 63/177,687, filed on Apr. 21, 2021.

(51) Int. Cl.
*H04W 64/00*    (2009.01)
*H04W 56/00*    (2009.01)
*H04W 68/00*    (2009.01)

(52) U.S. Cl.
CPC ....... *H04W 64/00* (2013.01); *H04W 56/0015* (2013.01); *H04W 68/00* (2013.01)

(58) Field of Classification Search
CPC ....... H04W 4/029; H04W 68/00; H04W 4/02; H04W 4/021; H04W 56/0015;

(Continued)

(56) References Cited

U.S. PATENT DOCUMENTS 5,673,259 A * 9/1997 Qick, Jr. ............... 370/342
10,771,927 B1 * 9/2020 Prendes et al. ....... H04W 4/029

(Continued)

OTHER PUBLICATIONS

Method For Determining Allowable Round Trip Time For Communication Between Base Station And Terminal Device, Involves Selecting Maximum Round Trip Time And Delivering Selected Allowable Round Trip Time To Base Station By Controller; WO 2021058852 A1; published to Ruttik, Kaller et al. (Year: 2021).*

*Primary Examiner* — Meless N Zewdu
(74) *Attorney, Agent, or Firm* — Christopher & Weisberg, P.A.

(57) ABSTRACT

A method implemented in a first wireless device is described. The method includes transmitting a plurality of paging requests, receiving a first plurality of bit streams, and performing a first correlation, during a reception window, of each bit stream. When a correlation threshold is exceeded, a synchronization packet is transmitted, a bit stream received, and a second correlation performed. When a third time difference between a first time difference and a second time difference is within a predetermined time difference range, a plurality of poll packets is transmitted, a second plurality of bit streams received, and a third correlation is performed of each bit stream of the second plurality of bit streams with a second expected bit stream. The method further includes determining a correlation time of a maximum correlation value of each poll packet and determining the plurality of RTTs corresponding to the plurality of poll pockets.

20 Claims, 17 Drawing Sheets

(58) Field of Classification Search
CPC ..... H04W 68/005; H04W 4/80; H04W 68/02; H04W 68/12; H04W 88/18; H04W 88/185; H04W 72/20; H04W 74/00; H04W 74/002; H04W 74/06; H04W 4/185; H04W 4/18; H04W 88/02; H04W 92/16; H04W 92/18; H04W 8/005; G01S 5/02; G01S 5/0205; G01S 5/0249; G01S 5/14; H04B 5/02; H04B 5/04; H04B 5/06
See application file for complete search history.

(56) References Cited

U.S. PATENT DOCUMENTS

| | | | | |
|---|---|---|---|---|
| 2017/0195923 | A1* | 7/2017 | Faurie et al. | H04W 36/0022 |
| 2018/0092061 | A1* | 3/2018 | Yamada | H04W 68/005 |
| 2018/0374322 | A1* | 12/2018 | Kim et al. | G08B 7/06 |
| 2021/0037388 | A1* | 2/2021 | Johansson et al. | H04W 12/1004 |
| 2021/0337505 | A1* | 10/2021 | Krishnamoorthy et al. | H04W 68/005 |

\* cited by examiner

RX/TX cycle of master transceiver in normal mode for single-slot packets

RX/TX cycle of slave transceiver in normal mode for single-slot packets

FIG. 6

| Step | Message | Packet Type | Direction | Hopping Sequence | Access Code and Clock |
|---|---|---|---|---|---|
| 1 | Page | ID | Master to Slave | Page | Slave |
| 2 | First slave page response | ID | Slave to Master | Page response | Slave |
| 3 | Master page response | FHS | Master to Slave | Page | Slave |
| 4 | Second slave page response | ID | Slave to Master | Page response | Slave |
| 5 | 1st packet master | POLL | Master to Slave | Channel | Master |
| 6 | 1st packet slave | Any type | Slave to Master | Channel | Master |

601
602
603
604
605
606

Messaging at initial connection when slave responds to first page message

Messaging at initial connection when slave responds to second page message

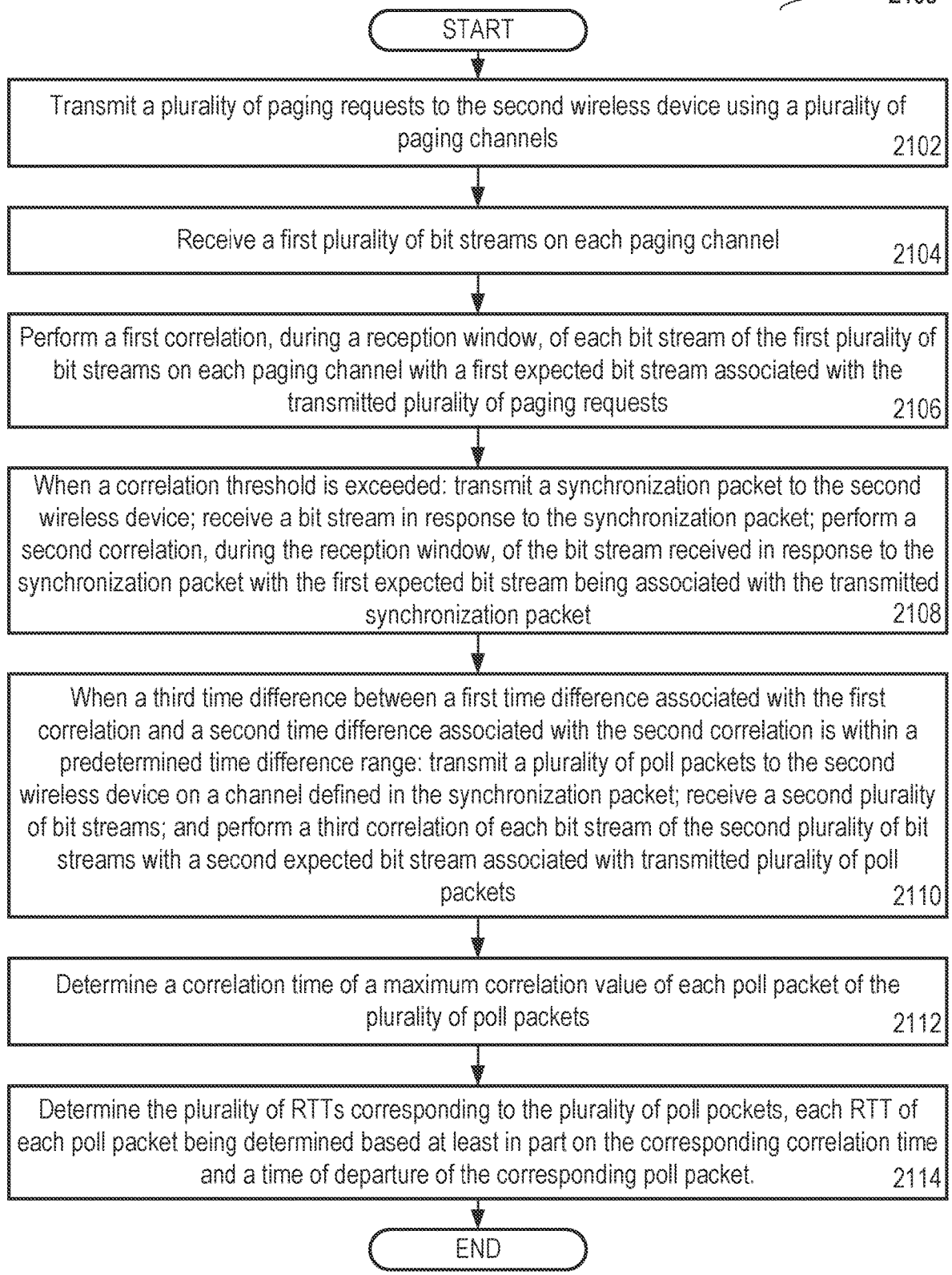

ACTIVE GEO-LOCATION FOR PERSONAL AREA NETWORK DEVICES USING CORRELATION

CROSS-REFERENCE TO RELATED APPLICATION

This application is related to and claims priority to U.S. Provisional Patent Application Ser. No. 63/177,687, filed Apr. 21, 2021, entitled ACTIVE GEO-LOCATION FOR PERSONAL AREA NETWORK DEVICES USING CORRELATION, the entirety of which is incorporated herein by reference.

TECHNICAL FIELD

The present disclosure relates to wireless communications, and in particular to methods and devices for geo-location of Classic Bluetooth Basic Rate (BR) devices.

BACKGROUND

The Bluetooth system is specified in "Specification of the Bluetooth® System, Covered Core Package Version: 5.0, Publication Date: Dec. 6, 2016 ("Specification of the Bluetooth® System"). Bluetooth operates in the unlicensed Industrial, Scientific, and Medical (ISM) band from 2.400 to 2.4835 GHz. Classic Bluetooth Basic Rate (BR) and Bluetooth Low Energy (BLE) employ Gaussian Frequency-Shift Keying (GFSK) as the primary modulation scheme, while Classic Bluetooth Enhanced Data Rate (EDR) incorporates differential phase-shift keying (DPSK) for increased throughput. BR may occupy any of 79 radio frequency (RF) channels, spaced by 1 MHz, whereas BLE is limited to 40 RF channels, spaced by 2 MHz. For both BR and BLE, the nominal channel symbol rate is 1 MHz, with a nominal channel symbol duration of 1 µs.

A more complete understanding of the present embodiments, and the attendant advantages and features thereof, will be more readily understood by first describing relevant Bluetooth® system details. Relevant details of the Bluetooth® system are therefore presented herein. A more complete description can be obtained by reference to the Specification of the Bluetooth® System, the entirety of which is incorporated herein by reference.

Bluetooth® is a time division multiplex (TDM) system that includes a "Master" device, which initiates an exchange of data, and a "Slave" device which responds to the Master. The TDM slot duration is 625 µs, and the maximum payload length is such that certain packet types may extend up to five slots in length. Each device will hop to an RF channel once per packet and Slave devices will utilize the timing of their Master to hop in synchronization.

There are two basic types of data packets and links: Asynchronous Connectionless (ACL) and Synchronous Connection Oriented (SCO). ACL is used for data communications with just one ACL link per device pair. SCO is used for real time audio links, and each device may support up to 3 SCO links at one time.

FIG. 1 is a diagram of a typical receive/transmit (RX/TX) cycle for the master transceiver in normal mode for single-slot packets. Each TX slot and RX slot is of duration 625 µs. The master transceiver transmits in TX slot 110 on hop channel f(k) and is followed by the RX slot 120, on hop channel f(k+1). The master then transmits in the next slot 130 on hop channel f(k+2). The time between consecutive TX slots and RX slots is therefore 1250 µs. FIG. 2 is a diagram of the typical corresponding RX/TX cycle of the slave transceiver. The slave transceiver receives during slot 210, on hop channel f(k) and transmits on hop channel f(k+1) 220. The duration of the transmitted packet 140 is less than or equal to 426 µs. The Bluetooth® physical channel is characterized by the combination of a pseudo-random frequency hopping sequence, the specific slot timing of the transmissions, the access code and the packet header encoding. The basic piconet channel is used for communication between connected devices and is characterized by a unique pseudo-random frequency hopping sequence determined by the Bluetooth clock of the master.

FIG. 3 is a diagram that shows the format of the unique Bluetooth Device Address (BD_ADDR) 300. The BD_ADDR 300 is split into three parts, lower address part (LAP) 310, upper address part (UAP) 320, and non-significant address part (NAP) 330. In order to establish a connection to a Bluetooth® device only the UAP and LAP are required. The NAP is informative, and devices often use a default NAP to establish connectivity.

FIG. 4 is a diagram that shows the general format for the Classic Bluetooth BR packet type. Every packet starts with an Access Code 410. If a packet header follows, the access code is 72 bits long, otherwise the access code is 68 bits long and is known as a shortened access code. For any packet not comprised, solely, of a shortened Access Code, the Access Code is followed by a 54-bit GFSK Packet Header 415, which is generated by encoding an 18-bit information field using a rate ⅓ repetition code. The Header is followed by the payload 420.

FIG. 5 is a diagram showing the Access Code 410 format. The Access Code 410 is used for synchronization and identification and identifies all packets exchanged on a physical channel. The Access Code 410 begins with a 4-bit preamble 510 (either 0101 or 1010), and, for non-shortened Access Codes, ends with a 4-bit trailer 520 (also either 0101 or 1010). The 4-bit preamble 510 is followed by the Sync Word 515. The Sync Word is a 64-bit code word derived from a 24-bit LAP. For device access codes (DAC), the slave LAP is used, and for channel access codes (CAC), the master LAP is used. An "ID" packet comprises either the DAC or the CAC. The paging ID is the DAC, used during paging, and the ID used for all packets exchanged on the piconet physical channel is the DAC.

The default state of a Bluetooth® device is the Standby state. In this state, the device may be in a low-power mode. A device may leave the Standby state to scan for page or inquiry messages or to page or inquire itself. In order to establish new connections, the paging procedure or the synchronization scan procedure is used. Only the Bluetooth® device address, BD_ADDR 300, as discussed above with reference to FIG. 3, is required to set up a connection using the paging procedure. A device that establishes a connection using a page procedure will automatically become the master of the connection.

An unconnected Bluetooth® device must periodically enter the page scan state; in this state, the device activates its receiver and listens for a master device that might be trying to page it. During the page scan state, the unconnected device listens on one of 32 channels, for at least 10 ms (16 slots). In the general sense and as an example, a different channel is selected every 1.28 seconds (2048 slots). When commanded to enter the page state, the master device starts to transmit, using 16 of the 32 channels being used by the paged device. During every even numbered slot it transmits two ID packets on two different channels, and during the following slot it listens on two different channels for the slave's response (also an ID packet). In the next two slots it uses the next two channels, so the hopping sequence (of 16 channels) repeats every 10 ms (16 slots). The master repeats the 16 slot sequence for at least long enough for the paged device to enter the page scan state, which in the general sense is 128 times, i.e., for at least 1.28 seconds. If the master does not receive a response, it will then try the other 16 channels.

FIG. 6 is a table of the initial messaging between a master and a slave when a master is paging a slave. In step 1 601 the master device it is assumed that the page message sent by the master is received correctly by the slave. On receiving the page ID, in step 2 602, the slave device transmits a slave page ID response (the ID is the slave's device access code). In step 3 603 the slave awaits the arrival of a Frequency Hopping Sequence (FHS) packet from the master and if it is received, in step 4 604, then the slave responds with a slave page ID response message to acknowledge the reception of the FHS packet. During the initial message exchange, steps 1 to 4, 601 to 604, all parameters are derived from the slave's device address, BD_ADDR, and that only the page hopping and page response hopping sequences are used (derived from the slave's device address, BD_ADDR).

In step 5, 605, the slave device enters the Connection state, and the slave device uses the master's clock and the master's BD_ADDR to determine the basic channel hopping sequence and channel access code. The FHS packet in step 3, 603, contains all the information for the slave to construct the channel access code. The connection mode starts with a Poll packet transmitted by the master in step 5, 605, and the slave, in step 6, 606, may reply with any type of packet but a Null packet is generally used for this response.

When paging, the master sends two pages, IDs, in a slot, spaced at 312.5 µs, half the slot time. FIG. 7 is a diagram showing an example of the timing of the paging packets when the slave responds to the first page ID in a slot. In the first slot, step 1 701, the master sends two pages 710 and 711, on channels f(k) and f(k+1) respectively, and then listens in the next slot, step 2 702, in turn on channels f'(k) and f'(k+1). If, in step 1 701, the slave is listening on channel f(k), then in step 2 702, it sends a response ID packet 712 on channel f'(k). In the next slot, step 3 703, the master then sends an FHS packet 714 on channel f(k+1). In the next slot, step 4 704, the slave responds to the FHS packet 714 with an ID response packet 716 on channel f'(k+1). At this point the paging sequence is complete and the mater and slave both change to the basic channel hopping sequence as defined in the FHS packet 714. In step 5 705, the master transmits the first traffic packet 718 which is generally a Poll packet, and in step 6 706, the slave responds with a Null packet 720.

FIG. 8 is a diagram showing an example of the timing of the paging packets when the slave responds to the second page ID in a slot. In the first slot, step 1 701, the master sends two pages 710 and 711, on channels f(k) and f(k+1) respectively, and then listens in the next slot, step 2 702, in turn on channels f'(k) and f'(k+1). If, in step 1 701, the slave is listening on channel f(k+1), then in step 2 702, it sends a response ID packet 812 on channel f'(k+1). In the next slot, step 3 703, the master then sends an FHS packet 814 on channel f(k+2). In the next slot, step 4 704, the slave responds to the FHS packet 814 with an ID response packet 816 on channel f'(k+2). At this point the paging sequence is complete and the mater and slave both change to the basic channel hopping sequence as defined in the FHS packet 814. In step 5 705, the master transmits the first traffic packet 818 which is generally a Poll packet, and in step 6, the slave responds with a Null packet 820.

The nominal time between the page ID 710 and the response ID of 712, in FIG. 7, is one slot time, 625 µs. Also, the nominal time between the page ID 711 and the response ID 812, in FIG. 8, is also one slot time, 625 µs, but the transmissions take place nominally 312.5 µs after the start of the slot. The respective FHS packets 714 and 814 are transmitted at the start of the slot, in step 3 703 and the nominal time between the FHS packets, 714 and 814, and the responses, 716 and 816, is again, nominally, one time slot, 625 µs.

The location of wireless devices can be performed by various methods. These methods may be classified as active, passive and combined active and passive. In an active location scheme, a device that is determining the location or range, the measuring device, transmits certain packets to the device being located, the target device, and the common method is to measure the time of arrival (ToA) of the response from the target device and compare that to the time of departure (ToD) that the packet was transmitted by the measuring device so as to determine the time for the round trip (RTT). ToD may be measured for a packet that is transmitted from the measuring station addressed to the target station. The ToA of the response from the target station, at the measuring station, is then also measured. If the turnaround time for the target station to receive the packet from the measuring station and to start to transmit the response is known, then the time difference at the measuring station between the ToA and the ToD, minus the turnaround time at the target station will be directly proportional to twice the distance of the target station from the measuring station. For example, if the target station is a wireless device based upon Bluetooth technology, and if the packet transmitted from the measuring station to the target station is a Poll packet, the response from the target station will generally be a Null packet. The effective turnaround time at the target will be the nominal 625 µs slot time. Hence, the time delay, td, between the measuring station and the target station may be determined from the calculation td=(ToA−ToD−Slot Time)/2 and the distance between the measuring station and the target station is then td×c, where c is the speed of light. This method of estimating the distance to a target station by measuring the ToD and ToA and accounting for the turnaround time is known.

In order to geo-locate a Bluetooth® device by measuring the time delay td, a series of packet exchanges may be utilized.

SUMMARY

Some embodiments advantageously provide methods, apparatuses, and systems for active geo-location for network devices using correlation.

According to one aspect, a method is described. The method is implemented in a first wireless device for determining a plurality of round trip times (RTTs) corresponding to communication between the first wireless device a second wireless device. The method includes transmitting a plurality of paging requests to the second wireless device using a plurality of paging channels, receiving a first plurality of bit streams on each paging channel, and performing a first correlation, during a reception window, of each bit stream of the first plurality of bit streams on each paging channel with a first expected bit stream associated with the transmitted plurality of paging requests. Further, the method includes, when a correlation threshold is exceeded, transmitting a synchronization packet to the second wireless device, receiving a bit stream in response to the synchronization packet, and performing a second correlation, during the reception window, of the bit stream received in response to the synchronization packet with the first expected bit stream being associated with the transmitted synchronization packet.

In addition, the method includes, when a third time difference between a first time difference associated with the first correlation and a second time difference associated with the second correlation is within a predetermined time difference range, transmitting a plurality of poll packets to the second wireless device on a channel defined in the synchronization packet; receiving a second plurality of bit streams; and performing a third correlation of each bit stream of the second plurality of bit streams with a second expected bit stream associated with transmitted plurality of poll packets. Further, the method includes determining a correlation time of a maximum correlation value of each poll packet of the plurality of poll packets and determining the plurality of RTTs corresponding to the plurality of poll packets. Each RTT of each poll packet is determined based at least in part on the corresponding correlation time and a time of departure of the corresponding poll packet.

In some embodiments, the method further includes determining the reception window, the determined reception window opening at a starting time, Ts, after each transmission from the first wireless device and closing at an ending time, Tc, after each transmission from the first wireless device.

In some other embodiments, the method further includes: determining a transmission time, ToDp, for each transmitted paging request; determining a reception time, ToAp, of a paging response, if the correlation threshold is exceeded when performing the first correlation; determining the first time difference, the determined first time difference being equal to ToAp–ToDp; determining a transmission time, ToDf, of the synchronization packet;
determining a reception time, ToAf, of a synchronization packet response, if the correlation threshold is exceeded when performing the second correlation; and determining the second time difference, the determined second time difference being equal to ToAf–ToDf In one embodiment, the method further includes determining and recording the maximum correlation value of each poll packet of the plurality of poll packets; determining whether the plurality RTTs correspond to a reception of noise by examining the RTT of each poll packet; and if the plurality RTTs correspond to a reception of noise: determining the correlation threshold, IDTh:

$$IDTh = Cave\sqrt{126/68} + Thm$$

where $Cave = \frac{1}{N}\sum_{i=1}^{N} Cmax_i;$

Cmax is the maximum correlation value; and
Thm is a threshold margin, the threshold margin being variable.

In another embodiment, the threshold margin is varied based on an average time between determinations that the plurality of RTTs do not correspond to the reception of noise and correspond to true Null packets.

In some embodiments, increasing the threshold margin causes a time between detections of the true Null packets to decrease, and a sensitivity of detecting the true Null packets to decrease, and decreasing the threshold margin causes the time between the detections of the true Null packets to increase, and the sensitivity of detecting the true Null packets to increase.

In some other embodiments, the method further includes sorting the plurality of RTTs into a plurality of time bins, B, a time width of each time bin of the plurality of time bins being (Tc–Ts)/B such that all RTTs within (Tc–Ts)/B of each other are in the same bin.

In one embodiment, the method further includes counting the RTTs in each time bin of the plurality of time bins; determining a first count of RTTs, r1, in a time bin of the plurality of time bins with a highest count of RTTs; and determining a second count of RTTs, r2, in another time bin of the plurality of time bins with a next highest count of RTTs.

In another embodiment, the method further includes: determining a ratio r1/r2; comparing the ratio r1/r2 with a predetermined ratio threshold, R; and if the ratio r1/r2 is less than the predetermined ratio threshold, R, assuming that the plurality of RTTs correspond to a reception of noise.

In some embodiments, method further includes determining a first location of the first wireless device and determining a second location of the second wireless device based at least in part on the determined first location and the determined the plurality of RTTs.

According to another aspect, a first wireless device is described. The first wireless device is configured for determining a plurality of round trip times (RTTs) corresponding to communication between the first wireless device a second wireless device. The first wireless device comprises processing circuitry configured to cause the first wireless device to transmit a plurality of paging requests to the second wireless device using a plurality of paging channels, receive a first plurality of bit streams on each paging channel, and perform a first correlation, during a reception window, of each bit stream of the first plurality of bit streams on each paging channel with a first expected bit stream associated with the transmitted plurality of paging requests.

The processing circuitry is further configured to, when a correlation threshold is exceeded, cause the first wireless device to transmit a synchronization packet to the second wireless device, receive a bit streams in response to the synchronization packet, and perform a second correlation, during the reception window, of the bit stream received in response to the synchronization packet with the first expected bit stream being associated with the transmitted synchronization packet. In addition, the processing circuitry is further configured to, when a third time difference between a first time difference associated with the first correlation and a second time difference associated with the second correlation is within a predetermined time difference range, cause the first wireless device to transmit a plurality of poll packets to the second wireless device on a channel defined in the synchronization packet, receive a second plurality of bit streams, and perform a third correlation of each bit stream of the second plurality of bit streams with a second expected bit stream associated with transmitted plurality of poll packets. A correlation time of a maximum correlation value of each poll packet of the plurality of poll packets is also determined. Further, the processing circuitry is configured to determine the plurality of RTTs corresponding to the plurality of poll pockets. Each RTT of each poll packet is determined based at least in part on the corresponding correlation time and a time of departure of the corresponding poll packet.

In some embodiments, the processing circuitry is further configured to determine the reception window. The determined reception window opens at a starting time, Ts, after each transmission from the first wireless device and closes at an ending time, Tc, after each transmission from the first wireless device.

In some other embodiments, the processing circuitry is further configured to: determine a transmission time, ToDp, for each transmitted paging request; determine a reception time, ToAp, of a paging response, if the correlation threshold is exceeded when performing the first correlation; determine the first time difference, the determined first time difference being equal to ToAp−ToDp; determine a transmission time, ToDf, of the synchronization packet; determine a reception time, ToAf, of a synchronization packet response, if the correlation threshold is exceeded when performing the second correlation; and determine the second time difference, the determined second time difference being equal to ToAf−ToDf.

In one embodiment, the processing circuitry is further configured to: determine and recording the maximum correlation value of each poll packet of the plurality of poll packets; determine whether the plurality RTTs correspond to a reception of noise by examining the RTT of each poll packet; and if the plurality RTTs correspond to a reception of noise, determine the correlation threshold, IDTh:

$$IDTh = Cave\sqrt{126/68} + Thm$$

where $Cave = \frac{1}{N}\sum_{i=1}^{N} Cmax_i$;

Cmax is the maximum correlation value; and
Thm is a threshold margin, the threshold margin being variable.

In another embodiment, the threshold margin is varied based on an average time between determinations that the plurality of RTTs do not correspond to the reception of noise and correspond to true Null packets.

In some embodiments, increasing the threshold margin causes a time between detections of the true Null packets to decrease, and a sensitivity of detecting the true Null packets to decrease; and decreasing the threshold margin causes the time between the detections of the true Null packets to increase, and the sensitivity of detecting the true Null packets to increase.

In some other embodiments, the processing circuitry is further configured to sort the plurality of RTTs into a plurality of time bins, B, a time width of each time bin of the plurality of time bins being (Tc−Ts)/B such that all RTTs within (Tc−Ts)/B of each other are in the same bin.

In one embodiment, the processing circuitry is further configured to: count the RTTs in each time bin of the plurality of time bins; determine a first count of RTTs, r1, in a time bin of the plurality of time bins with a highest count of RTTs; and determine a second count of RTTs, r2, in another time bin of the plurality of time bins with a next highest count of RTTs.

In another embodiment, the processing circuitry is further configured to: determine a ratio r1/r2; compare the ratio r1/r2 with a predetermined ratio threshold, R; and if the ratio r1/r2 is less than the predetermined ratio threshold, R, assume that the plurality of RTTs correspond to a reception of noise.

According to one aspect, a system is described. The system comprises a first wireless device configured for determining a plurality of round trip times, RTT, corresponding to communication between the first wireless device a second wireless device. The first wireless device comprising processing circuitry configured to cause the first wireless device to transmit a plurality of paging requests to the second wireless device using a plurality of paging channels; receive a first plurality of bit streams on each paging channel; and perform a first correlation, during a reception window, of each bit stream of the first plurality of bit streams on each paging channel with a first expected bit stream associated with the transmitted plurality of paging requests. The processing circuitry is further configured to, when a correlation threshold is exceeded, cause the first wireless device to: transmit a synchronization packet to the second wireless device; receive a of bit streams in response to the synchronization packet; and perform a second correlation, during the reception window, of the bit stream received in response to the synchronization packet with the first expected bit stream being associated with the transmitted synchronization packet.

Further, the processing circuitry is further configured to, when a third time difference between a first time difference associated with the first correlation and a second time difference associated with the second correlation is within a predetermined time difference range, cause the first wireless device to: transmit a plurality of poll packets to the second wireless device on a channel defined in the synchronization packet; receive a second plurality of bit streams; and perform a third correlation of each bit stream of the second plurality of bit streams with a second expected bit stream associated with transmitted plurality of poll packets. A correlation time of a maximum correlation value of each poll packet of the plurality of poll packets is determined.

In addition, the processing circuitry is further configured to determine the plurality of RTTs corresponding to the plurality of poll pockets. Each RTT of each poll packet is determined based at least in part on the corresponding correlation time and a time of departure of the corresponding poll packet. A first location of the first wireless device is determined, and a second location of the second wireless device is determined based at least in part on the determined first location and the determined the plurality of RTTs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a table of the initial messaging between a master and a slave when a master is paging a slave;

FIG. 21 is another flow diagram of an example process according to some embodiments.

DETAILED DESCRIPTION

This Application incorporates U.S. Pat. No. 10,771,927 B1 by reference in its entirety. A process and devices are disclosed that use correlation to improve the sensitivity and hence the range for the geo-location of Bluetooth BR devices.

Figure 9:
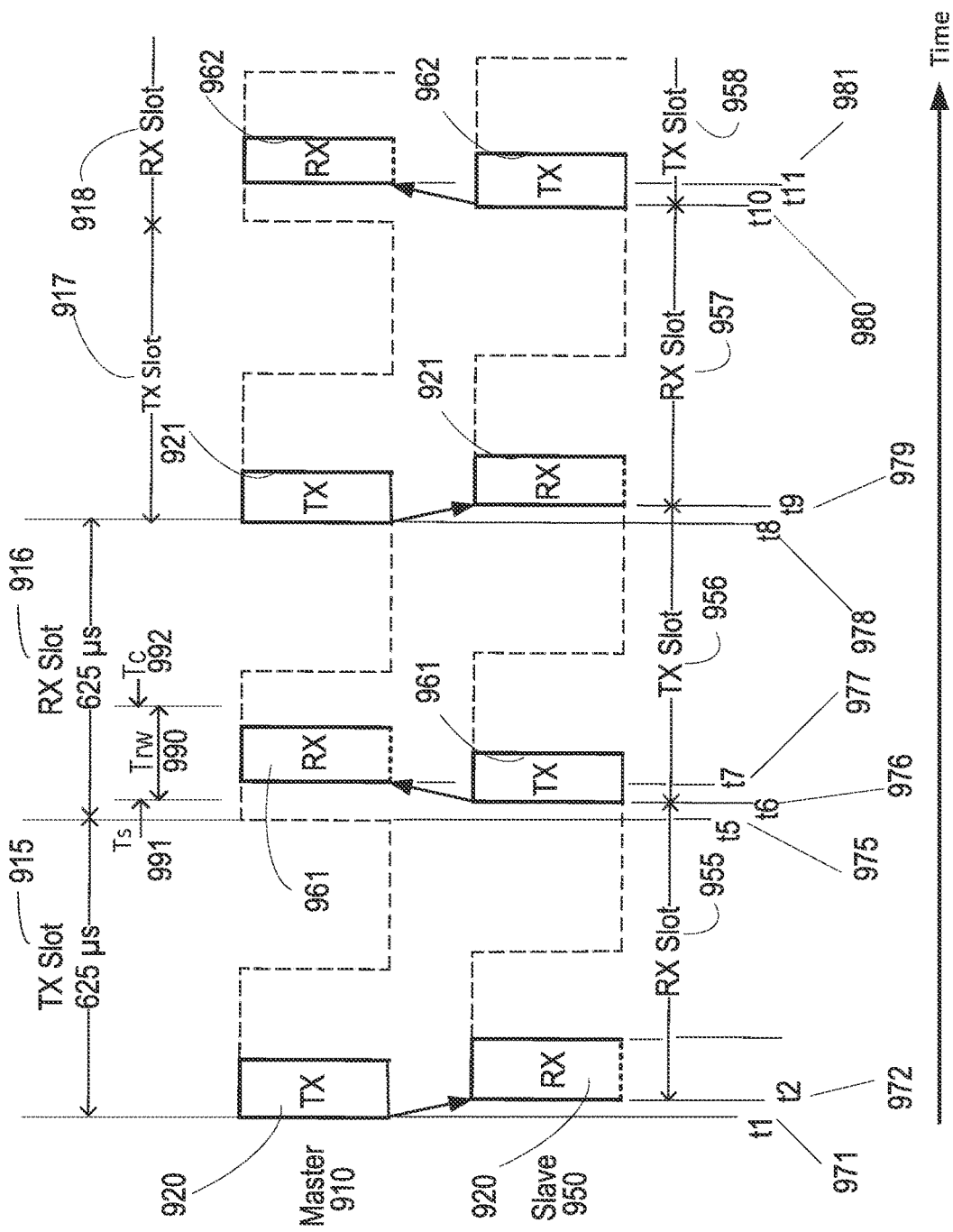
FIG. 9 is a timing diagram that describes an example ranging method of the present disclosure that may be used to determine the distance between two Bluetooth devices, a Master device and a Slave device, according to some embodiments.

FIG. 9 is a timing diagram that describes an example of the ranging method of the present disclosure that may be used to determine the distance between two Bluetooth® devices, a Master device 910 (also referred to herein as "Master 910") and a Slave device 950 (also referred to herein as "Slave 950"). The Master 910 has a TX Slot 915 followed by an RX Slot 916, each nominally 625 µs in duration. The TX Slot 915 starts at time t1 971 and the RX Slot 916 starts at time t5 975. Conversely the Slave 950 has an RX Slot 955 followed by a TX Slot 956, each nominally 625 µs in duration. The RX Slot 955 starts at time t2 972 and the TX slot starts at time t6 976. At time t1 971, the Master 910 may transmit a packet 920 to the Slave 950. This transmission packet 920 may be received at the Slave 950 at time t2 972. The time (t2-t1) is the propagation time of the packet 920 in travelling the distance between the Master 910 and the Slave 950. The Slave 950 may then respond to packet 920 with packet 961 in the next TX slot 956 at time t6 976. This packet 961 may be received by the Master 910 at time t7 977, in the corresponding RX Slot 916 of the Master 910. The time (t7-t6) is the propagation time of the packet 961 in travelling the distance between the Slave 950 and the Master 910. The time t1 971 is the ToD of packet 920 and the ToA of the response packet 961 is t7 977. The turnaround time is (t6-t2), the slot time of the Slave 950, nominally 625 µs. Hence, the time delay, td, which is equal to (t2-t1) and (t7-t6), between the Master 910 and the Slave 950 may be determined from the calculations $$td=[t7-t1-(t6-t2)]/2 \text{ or } td=(ToA-ToD-\text{Slot Time})/2 \qquad (1)$$

and the distance between the Master 910 and the Slave 950 is then td×c, where c is the speed of light. The delta time (t7-t1) or (ToA-ToD) corresponds to the time that the Master 910 receives packet 961 minus the time that the Master 910 transmitted packet 920.

At time t8 978, at the start of the Master's next TX slot 917, another packet 921 may be transmitted by the Master 910 to the Slave 950. This packet may be received by the Slave 950 at time t9 979 and at the start of the Slave's next TX slot 958, at time t10 980, the Slave 950 may transmit the response packet 962 to the Master 910 which may be received by the Master 910 at time t11 981. For this packet exchange 921 and 962 the time delay, td', which is equal to (t9-t8) and (t11 410), between the Master 910 and the Slave 950 may be determined from the calculation $$td'=[t11-t8-(t10-t9)]/2, \qquad (2)$$

where t11 is the ToA of packet 962, t8 is the ToD of packet 921 and (t10-t9) is the Slot time of the Slave 950. The delta time (t11-t8) the corresponds to the time that Master 910 receives packet 962 minus the time that the Master 910 transmitted packet 921.

If the position of the Master 910 is known, then by deriving values for td that result from the exchange of a number of packets between the Master 910 and the Slave 950, the distance from the Master 910 to the Slave 950 may be calculated. If the Master 910 moves in relation to the Slave 950, such that the distance from the Master 910 to the Slave 950 is calculated for varying angles between the two, e.g., the Master 910 is in a vehicle or is airborne, then the location of the Slave 950 may be calculated. Such methods for calculating a location based on a series of time delay measurements taken at varying angles between a master and a slave are known.

A reception window Trw 990 may be defined which may be related to the range of the Slave 950. The reception window starts at time Ts 991 after the start of every Master RX slot, such as 916 and 918, and ends at time Tc 992 after the start of every Master RX slot. As an example, in the RX slot 916, the reception window Trw may be set to start at time Ts 991, 10 µs after time T5 975, and end at time Tc 992 60 µs after time Tc 312. In this example the duration of the reception window Trw 990 is 50 µs and this corresponds to the time window within which the Master 910 may expect to receive a packet from the Slave 950.

The more packets that are exchanged between the Master 910 and the Slave 950, the better the accuracy of the calculated distance td×c. Basically, if the measuring error of td in each packet is Δt, then if there are N packet exchanges, the error is reduced by the square root of N. For example, if td is measured in microseconds, the maximum measurement error is ±1 μs. If td is measure over 100 packets, then the measurement error is reduced by 10, i.e., ±0.1 μs.

The specification for Bluetooth receive sensitivity is −70 dBm for a raw bit error rate, BER, of 0.1%. However, sensitivities in the order of −90 to −96 dBm are typical. Classic Bluetooth Basic Rate (BR) employs Gaussian Frequency-Shift Keying (GFSK) as the primary modulation scheme.

The probability of a bit error, Pb, for coherent BFSK, is $$Pb = 0.5 \, \text{erfc} \sqrt{E_b/2N_0} \qquad (3)$$

Where erfc is the Gauss complementary error function
$E_b$ is energy per bit
$N_0$ is noise per hertz
For BFSK, $$E_b/N_0$$

is equal to the signal to noise ratio, SNR.
The packet error rate, PER, is related to the bit error, Pb by the expression $$\text{PER} = 1 - (1 - Pb)^M \qquad (4)$$

Where M is the number of bits in the packet
The received signal level is calculated using the standard formula:

$$Pr = 10 \log(1000K\,T) + 10 \, \text{Log BW} + \text{NF} + \text{SNR dBm} \qquad (5)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
Example:
BW=1 MHz
BER, Pb=0.001, hence, from (3) SNR=8 dB
assume a NF of 3 dB.
Hence, Pr=−174+60+3+8=−103 dBm This result is based upon the assumption of coherent BFSK detection and zero implementation loss. Most, if not all Bluetooth devices use non-coherent detection and GFSK is less sensitive than BFSK. The difference between coherent FSK detection and non-coherent FSK detection is not significant for higher SNRs, but for negative SNRs, there is a significant difference. Coherent detection, together with a 3 dB implementation loss, is assumed in the analyses that follow.

Correlation works by passing the known pattern across the noisy pattern, and if the bits/symbols agree, "correlate" or match, they add, if not they subtract. For a packet of M bits, M.Pb bits will not match, and M(1−Pb) will match, Hence Correlation=(Match−Mismatch)/Total or Correlation=$(M-2M.Pb)/M=(1-2Pb)$ (6)

For example, for Pb=0.2, Correlation=(1−2×0.2)=0.6 or 60%
Note that the correlation is independent of the number of bits.
Note that for pure noise, Pb=0.5. Hence M/2 bits will agree (match), M/2 will not agree (mismatch), and the correlation will be 0%. Thus, for correlation of 0% there are M/2 bits matching.

If the raw detected 68 bits of the ID packets are correlated across the known bits of the complete packet, then it is possible to detect an ID packet that is well below the noise level.

For a given SNR, the bit error Pb may be calculated using equation (3) and the correlation % calculated using equation (6). The variance and standard deviation, σ, of the mismatched bits may be calculated:

$$\sigma^2 = M\,Pb(1-Pb)$$

$$\sigma = \sqrt{MPb(1-Pb)} \qquad (7)$$

For M bits, the number of mismatched bits is M Pb, with a standard deviation of σ. Hence, mismatched bits=M.Pb±σ, and the number of matched bits is M−(M.Pb±σ).
Thus, the correlation is given by:

$$\text{Correlation} = (M - (MPb \pm \sigma) - (MPb \pm \sigma))/M \qquad (8)$$
$$= 1 - 2Pb \pm 2\sigma/M$$

Comparing (8) to (6), the following associations can be made:

$$\text{Correlation mean} = (1 - 2Pb) \qquad (9)$$

and Correlation standard deviation=$2\sigma/M$. (10)

Noise has a bit error rate, Pb=0.5 with a mean of zero and thus,
from equation (7), $\sigma = \sqrt{M/4}$, and from equation(10)noise correlation standard
deviation=$\sqrt{1/M}$ (11)

Figure 10:
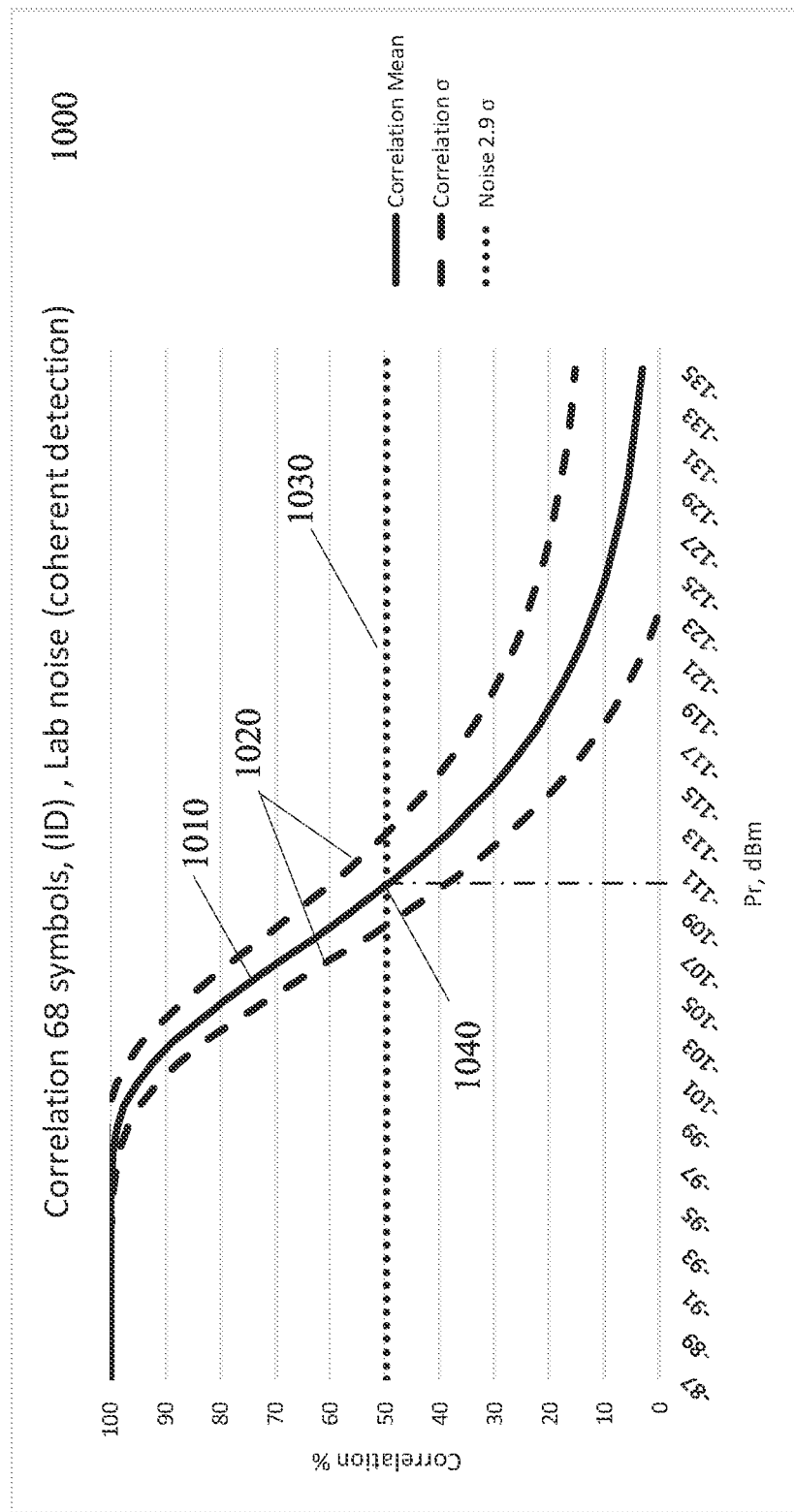
FIG. 10 is a graph of an example correlation versus received signal strength for an ID packet, according to some embodiments.

FIG. 10 is a graph 1000 of an example of the correlation versus received signal strength for an ID packet. The mean correlation 1010 is derived from equation (9), and the standard deviations for the correlation, +σ and −σ, 1020, are derived from equation (10). The noise 2.9σ correlation, 1030, derived from equation (11) is about 50% and equates to a received signal strength of −111 dBm, 1040, an improvement of about 15 dB over the standard sensitivity (−96 dBm).

Figure 11:
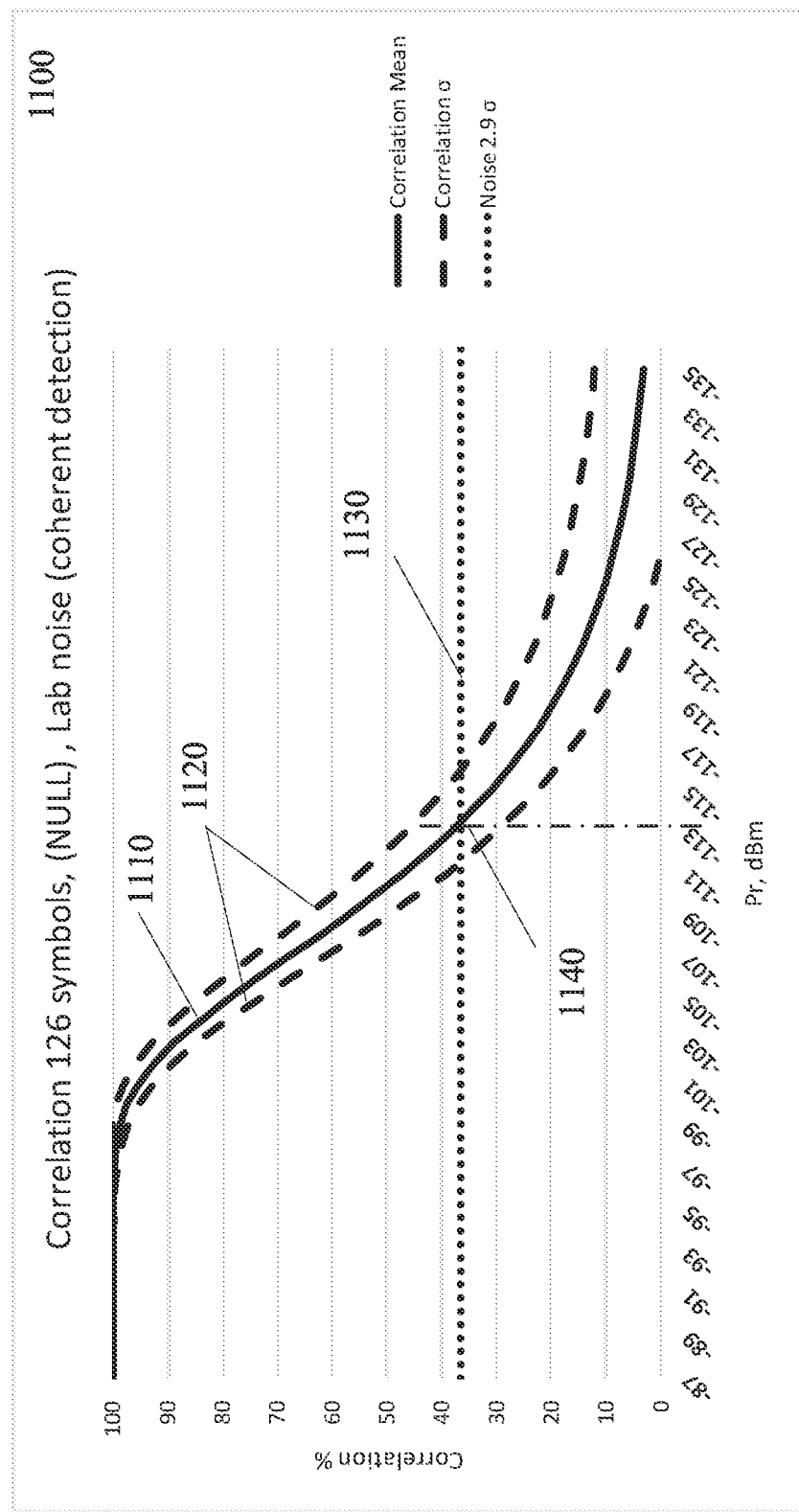
FIG. 11 is a graph 1100 of an example correlation versus received signal strength for a Null packet, according to some embodiments.

FIG. 11 is a graph 1100 of an example of the correlation versus received signal strength for a Null packet. The mean correlation 1110 is derived from equation (9), and the standard deviations for the correlation, +σ and −σ, 1120, are derived from equation (10). The noise 2.9σ correlation, 1130, derived from equation (11) is about 37% and equates to a received signal strength of −114 dBm, 1140. The better performance of the correlation of a Null packet compared to the ID packet is because a Null packet comprises 126 bits and the ID packet only 68.

FIGS. 10 and 11 are calculated based upon equation (5) assuming a 3 dB NF and an implementation loss of 3 dB. This is termed "laboratory" conditions. When deployed in suburban or urban environments, the background noise is higher. An increase of noise level of 3 dB may be assumed for "suburban" conditions.

Figure 12:
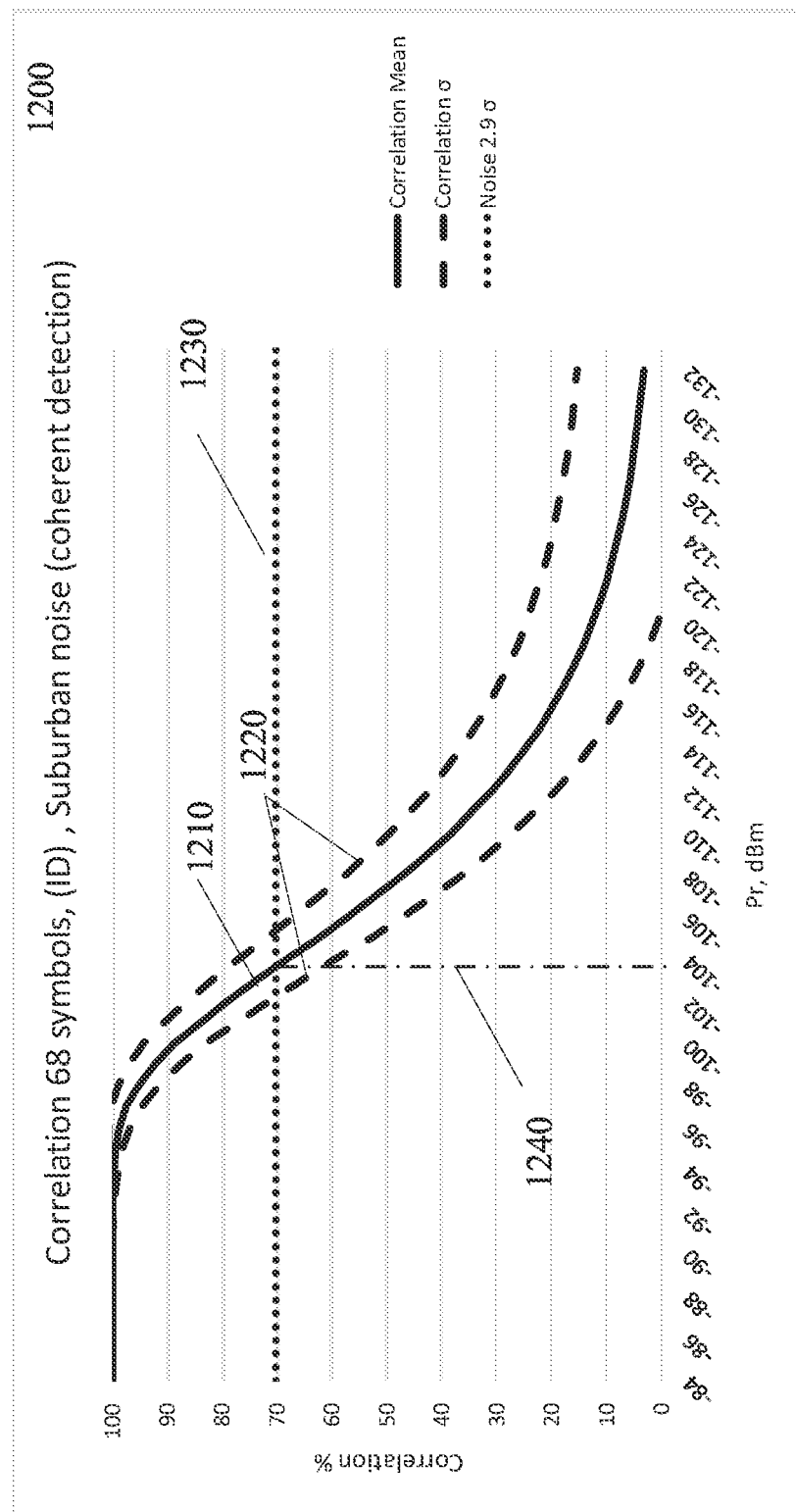
FIG. 12 is a graph of an example correlation versus received signal strength for an ID packet in suburban noise conditions, according to some embodiments.

FIG. 12 is a graph 1200 of an example of the correlation versus received signal strength for an ID packet in suburban noise conditions. The mean correlation 1210 is derived from equation (9), and the standard deviations for the correlation, +σ and −σ, 1220, are derived from equation (10). The noise 2.9σ correlation, 1230, derived from equation (11) is now about 70% and equates to a received signal strength of −104 dBm, 1240, an improvement of about 11 dB over the standard sensitivity (−93 dBm).

Figure 13:
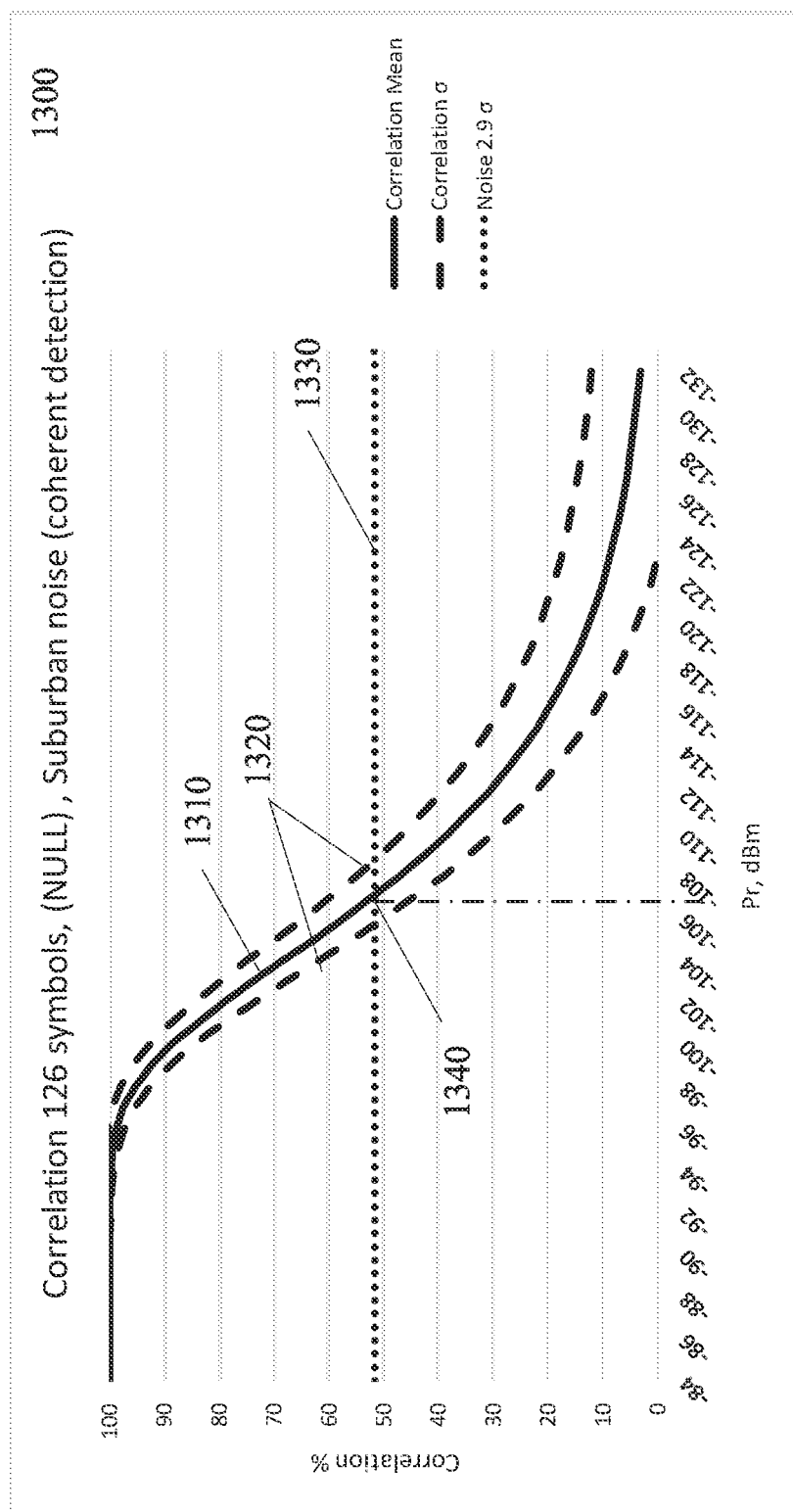
FIG. 13 is a graph of an example correlation versus received signal strength for a Null packet in suburban noise conditions, according to some embodiments.

FIG. 13 is a graph 1300 of an example of the correlation versus received signal strength for a Null packet in suburban noise conditions. The mean correlation 1310 is derived from equation (9), and the standard deviations for the correlation, +σ and −σ, 1320, are derived from equation (10). The noise 2.9σ correlation, 1330, derived from equation (11) is about 52%, 1340, and equates to a received signal strength of −107 dBm.

The reception window, Trw 990, as discussed above with reference to FIG. 9, is the time that the medium is sampled looking for the incoming packet. The window may be related to the expected or estimated distance to the target. Assuming that the sampling rate is S samples per second, a correlation value is produced for every sample. During the reception window Trw 990 a set of correlation values, C, are derived. Hence, C={$c_1, c_2, \ldots c_w$} where W is the number of samples in the reception window. As an example, the duration of a reception window may be 50 µs and at a typical sampling rate of 8 MS/sec there are 400 correlation values in the reception window of which only one would correspond to the wanted. In order to be detected, the correlation peak of the wanted signal must be greater than the highest peak due to noise, but there are 400 correlations due to noise. The Gumbel distribution may be used to describe the distribution of the maxima of a sample size n, where, for example n=400. Using the Gumbel distribution, it can be shown that with n=400, there is a 50% chance that a 2.9 σ value is exceeded. The noise 2.9 σ noise value therefore represents the correlation threshold for 50% probability of a successful correlation result for a 50 µs reception window. Therefore, with reference again to FIG. 10, there is a 50% probability that a wanted ID packet is detected above noise at a received signal strength of −111 dBm 1040, and with reference again to FIG. 11, there is a 50% probability that a wanted Null packet is detected above noise at a received signal strength of −114 dBm 1140.

The Gumbel distribution may be used to describe the distribution of the maxima of a sample size n, where, for example n=400. The cumulative distribution function, CDF, $\mathcal{F}_g$, of the Gumbel distribution is:

$\mathcal{F}_g(x; \mu, \beta) = e^{-e^{-(x-\mu)/\beta}}$ with location µ, scale β for a value of n Where $$\mu = \mathcal{F}^{-1}\left(1 - \frac{1}{n}\right) \text{ and } \beta = \mathcal{F}^{-1}\left(1 - \frac{1}{ne}\right) - \mu$$

and $\mathcal{F}$ is the CDF of the Normal distribution.
The probability, Pw, that the wanted correlation is greater than the peak noise correlation is $$P_w = \mathcal{G}\ u(x;\mu,\beta) \cdot [1 - \mathcal{F}(x)] dx \quad (12)$$

Where $\mathcal{G}\ u(x; \mu, \beta)$ is the Gumbel PDF of noise with location µ, scale β for a value of n and [1−$\mathcal{F}$(x)] is the complement cumulative distribution function (1−CDF) of the normal distribution of the wanted signal correlation with mean and standard deviation as per equations (9) and (10).

Figure 14:
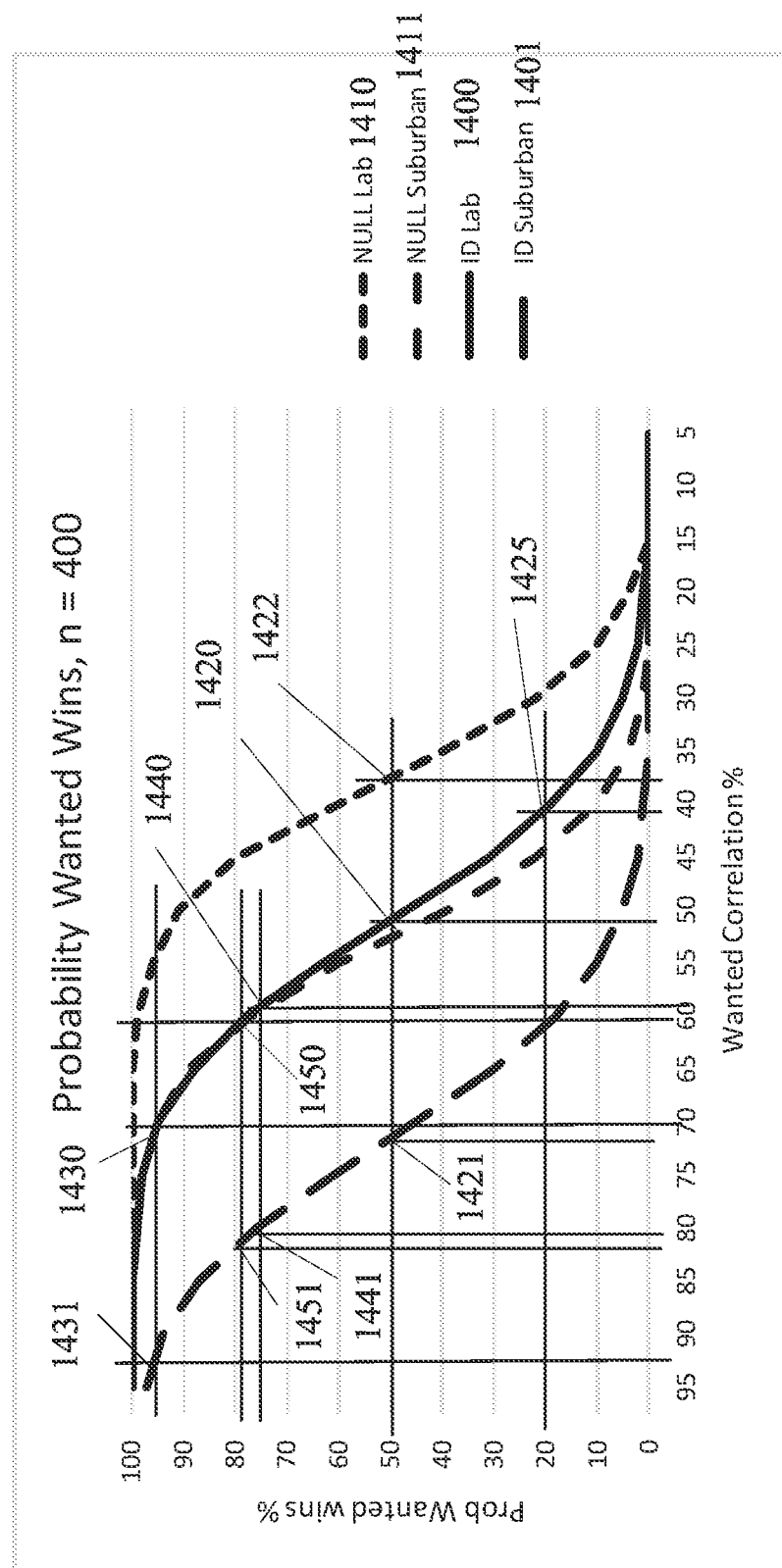
FIG. 14 is a graph that shows an example probability that a wanted packet is higher than the peak noise for varying mean correlation %, according to some embodiments.

FIG. 14 is a graph that shows the probability that a wanted packet is higher than the peak noise for varying mean correlation %. Plots 1400 and 1401 are the probabilities that the wanted ID packet is higher than the peak noise for laboratory and suburban conditions respectively. For example, the 50% chance that ID packet correlates higher than suburban noise is 71%, 1421, as is also shown in FIG. 12, 1230. Also, the 50% chance that ID packet correlates higher than laboratory noise is 50%, 1420, as is shown in FIG. 10, 1030. If, for example, the correlation threshold was set at 40%, then there is only a 20% chance 1425 that the wanted ID packet will exceed the noise. Plots 1410 and 1411 are the probabilities that the wanted Null packet is higher than the peak noise for laboratory and suburban conditions respectively. The 50% chance that Null packet correlates higher than laboratory noise is when the correlation threshold is set to 37%, 1422, as is also shown in FIG. 11, 1130.

Figure 1:
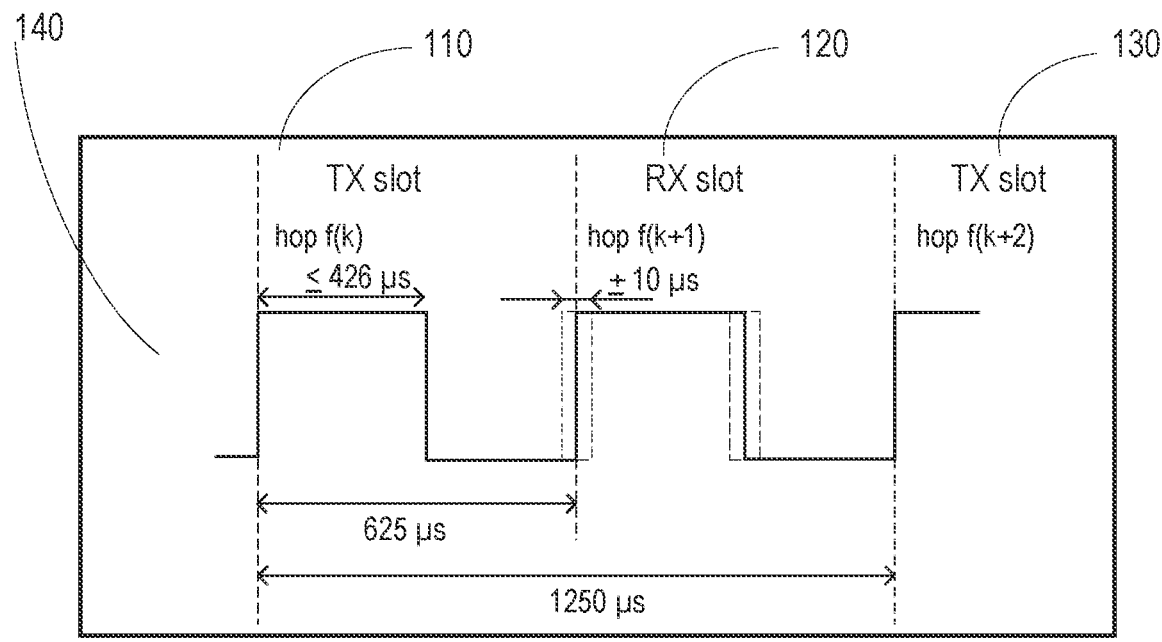
FIG. 1 is a diagram of a typical receive/transmit (RX/TX) cycle for the master transceiver in normal mode for single-slot packets.
Figure 2:
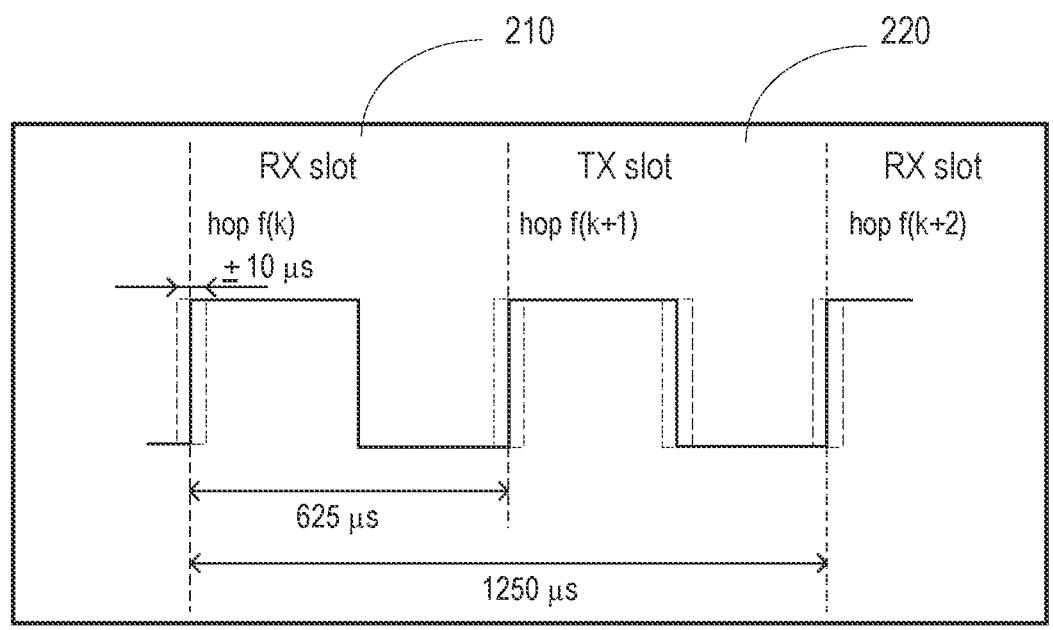
FIG. 2 is a diagram of the typical corresponding RX/TX cycle of the slave transceiver.
Figure 3:
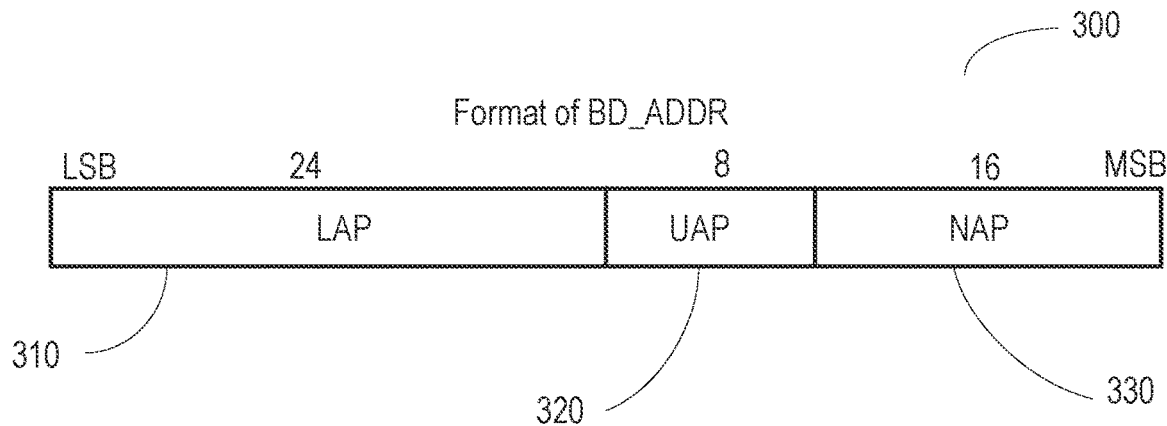
FIG. 3 is a diagram that shows the format of the unique Bluetooth Device Address (BD_ADDR)
Figure 4:
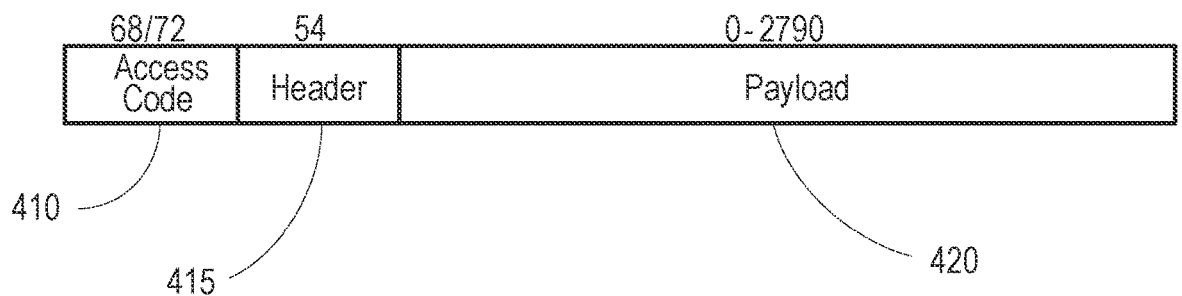
FIG. 4 is a diagram that shows the general format for the Classic Bluetooth BR packet type.
Figure 5:
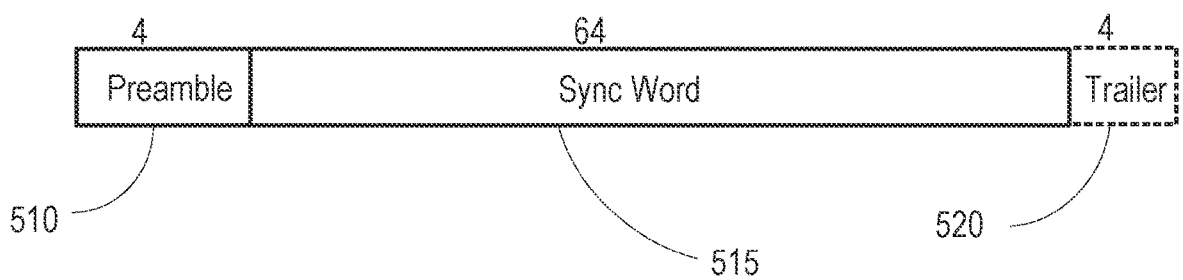
FIG. 5 is a diagram showing the Access Code format.
Figure 7:
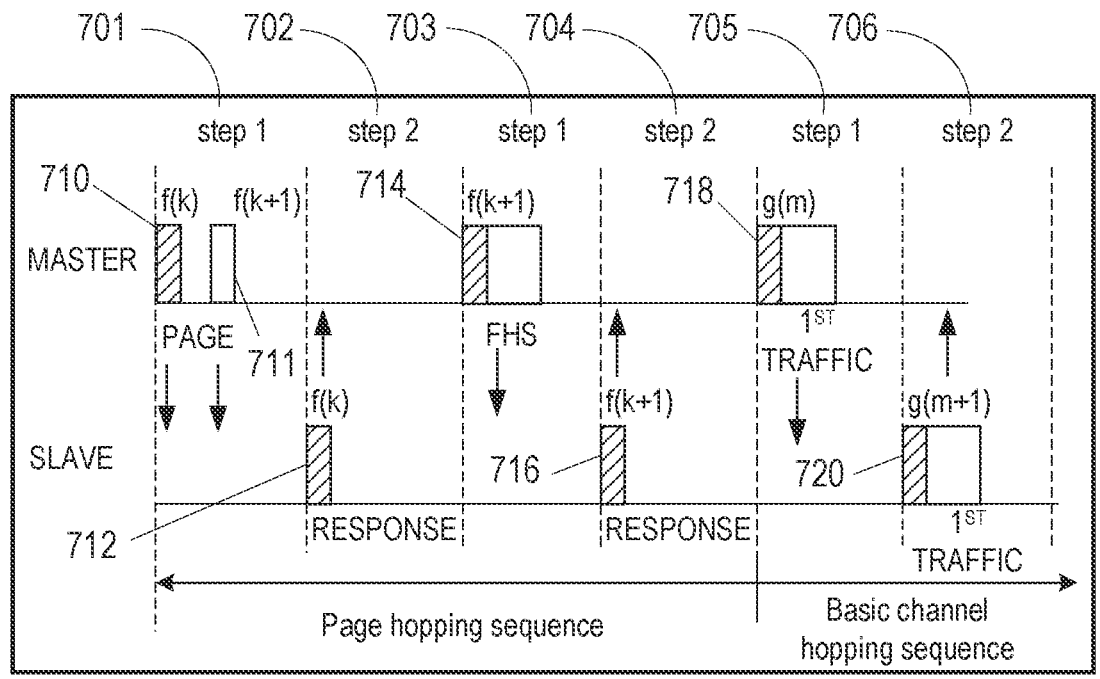
FIG. 7 is a diagram showing the timing of the paging packets when the slave responds to the first page ID in a slot.
Figure 8:
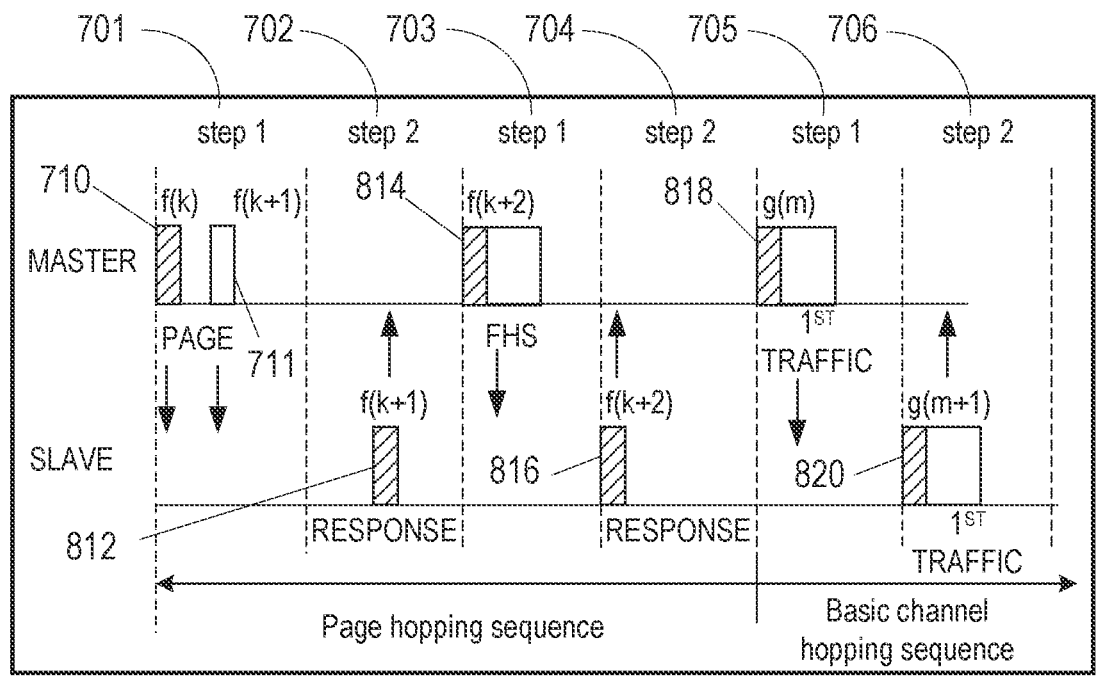
FIG. 8 is a diagram showing the timing of the paging packets when the slave responds to the second page ID in a slot.

The Target (Slave 950) should be paged and a piconet set up on the communication channel such that a number of packets, Polls and Nulls, can be exchanged and the RTTs measured, as discussed above with reference to FIG. 9. As discussed above with reference to FIGS. 6, 7 and 8, the Slave 950 is first paged in order to detect it. This means detecting an ID packet, 712 or 812, from the Slave 950. The Master 910 then sends an FHS packet, 714 or 814, which is confirmed by an ID response, 716 or 816 from the Slave 950. At that point the Master 910 sends a Poll, 718 or 818, on the new communication channel. This implies that a two ID packets have to be detected in order to switch to a communications channel. As discussed above with reference to FIGS. 10, 11, and 14, there is a probability that ID packets can be falsely detected due to noise. Hence, the sensitivity is limited by the detection of those IDs.

An example analysis of the probabilities of falsely detecting ID packets as the correlation threshold is varied is provided below.

If the probability of falsely detecting the ID packet due to noise is $P_{ID}$, then in order to falsely detect the two ID packets (712 and 716, or 812 and 816), the page response and the FHS acknowledgement, the probability is $P_{ID}^2$. In addition, the Slave 950 is only awake for 10 ms in 1.28 seconds, hence, assuming that the Slave 950 is waiting on a channel in the first 16 channel search, then there is a probability of 10/1280 that the Slave 950 is awake and listening during a specific 10 ms search. Consider the following example of $P_{ID}$=0.05. The chance of two ID packets being falsely detected is 0.05^2=0.0025. In each 10 ms period, there are 16 correlations so the false detection rate is 16×0.0025=0.04. The probability that the wanted is present in that 10 ms period is 1/128=0.0078. So, there is only a 0.0078/0.04=0.20 or 20% chance that the wanted ID is detected. A $P_{ID}$=0.05 is the same as the probability of the wanted winning being 95%. With reference to FIG. 14, for ID packets, 95% probability that the ID packet is greater than the noise requires a 70% correlation 1430 for laboratory noise and 92% correlation 1431 for suburban noise, i.e., a correlation threshold of 70% needs to be set for laboratory noise conditions, and a threshold of 92% need be set for suburban noise conditions. With reference to FIGS. 10 and 12, these correlation thresholds are equivalent to sensitivities of −107 dBm and −100 dBm which represent modest improvements in sensitivity for only a 20% chance that the wanted ID packets are detected. In addition, if there is a false detection, then, after sending a number of Polls on the false communications channel and then re-starting the paging, another 1.28 seconds on average elapses before the next open paging 10 ms window. Hence at 0.2 probability of success, there will be, on average, about 7.5 seconds between true detections.

A method is disclosed that checks the timings of receptions of the two response IDs, 712 and 812 or 716 and 816 such that the probability of false detection is reduced. As discussed above, with reference to FIGS. 7 and 8 and also with reference to FIG. 9, the time between the page ID, 710 or 711, transmitted by the Master 910 and the reception of the response ID, 712 or 812, is nominally 312.5 μs plus two times the propagation delay, td. Similarly, the time between the FHS, 714 or 814, transmitted by the Master 910 and the reception of the response ID, 716 or 816, is also nominally 312.5 μs plus two times the propagation delay, td. If these detections were due to noise correlations, then it is unlikely that the two-time differences would be the same or similar. If the detections were due to the wanted ID packets, then the two-time differences will be the same or similar. Hence, if it were stipulated that the time differences must be within ±1 μs of each other, then, assuming a 50 μs reception window 990, there is only a 1/25 chance that noise correlations will be within ±1 μs of each other. Hence, now consider the example of $P_{ID}=0.25$. The chance of two ID packets being falsely detected is now 0.25×0.25×1/25=0.0025. In each 10 ms period, there are 16 correlations, so the new false detection rate is 0.04. The probability that the wanted is present in that 10 ms period is still 0.0078, so again there is a 0.0078/0.04=0.20 chance that the wanted wins. A $P_{ID}=0.25$ is the same as the probability of the wanted winning being 75%. With reference to FIG. 14, for ID packets, 75% probability that the ID packet is greater than the noise requires a 58% correlation 1440 for laboratory noise and 80% correlation 1441 for suburban noise. With reference to FIGS. 10 and 12, these correlations are equivalent to receive sensitivities of −108 dBm and −102 dBm.

Hence:

Probability that the ID correlation is false=$P_{ID}$

Probability both IDs are false=$P_{ID}^2$

Reception Window=50 μs

Probability the two IDs are within ±δ μs=δ/25

Probability that two noise IDs detected as true=$P_{ID}^2 \times$ δ/25

There are 16 correlations every 10 ms, so chance of false detection=$P_{ID}^2 \times 16$ δ/25

Chance that the true ID is present in that 10 ms is 1/128=0.0078

Hence, the ratio of true to false detections is 0.0078/($P_{ID}^2 \times 0.64$ δ)

For δ=1, ratio of true to false detections=$0.0122/P_{ID}^2$

This expression $0.0122/P_{ID}^2$ is the probability of the wanted winning.

Figure 15:
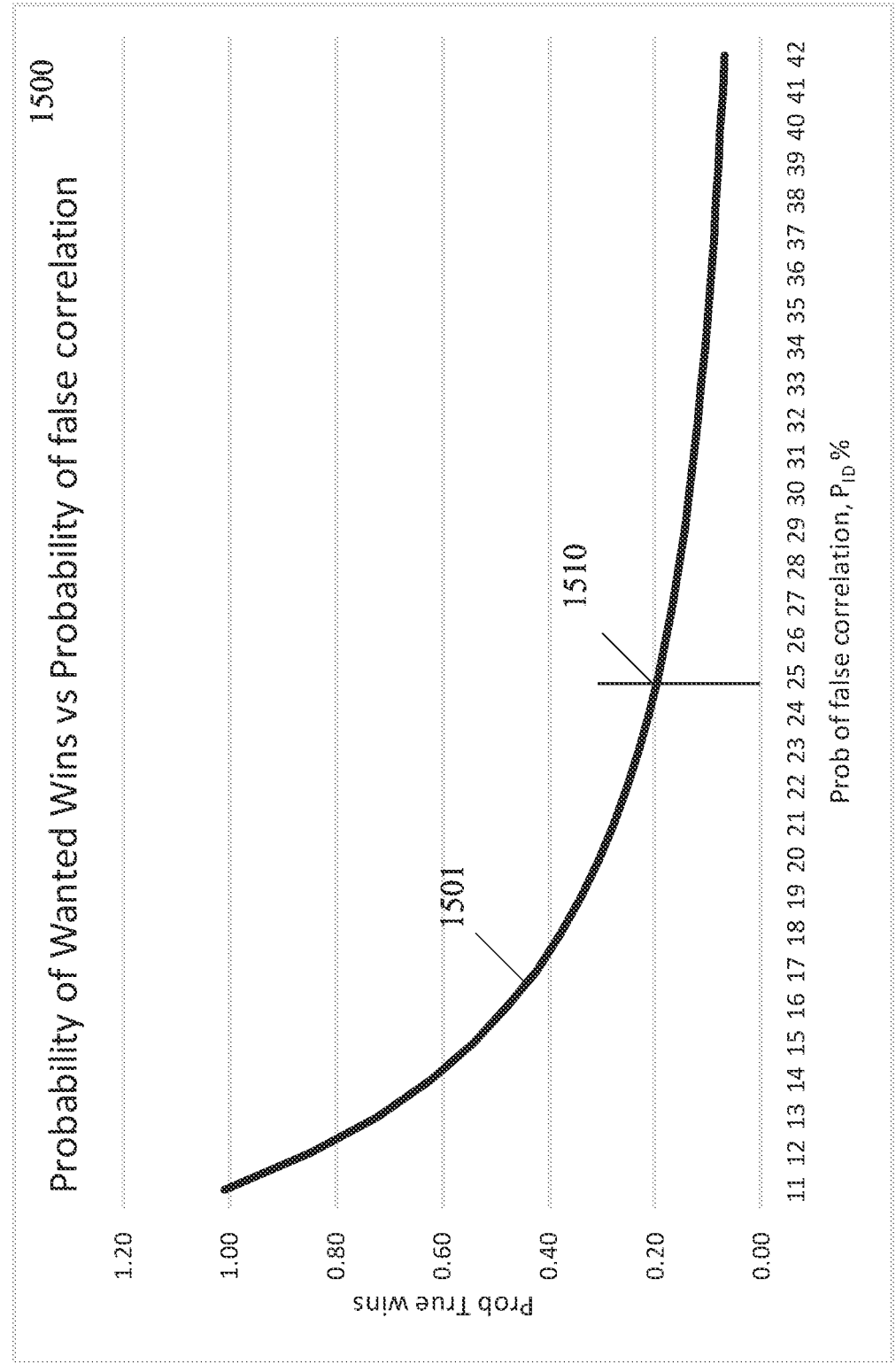
FIG. 15 is a graph of an example probability that two wanted ID packets are detected for varying probabilities that the ID correlation is false, PID, according to some embodiments.

FIG. 15 is a graph 1500 of an example of the probability, plot 1501, that two wanted ID packets are detected for varying probabilities that the ID correlation is false, $P_{ID}$. For example, for a $P_{ID}$ of 25%, 1510, the probability that the wanted IDs are detected is 0.20, as per the example above.

Figure 16:
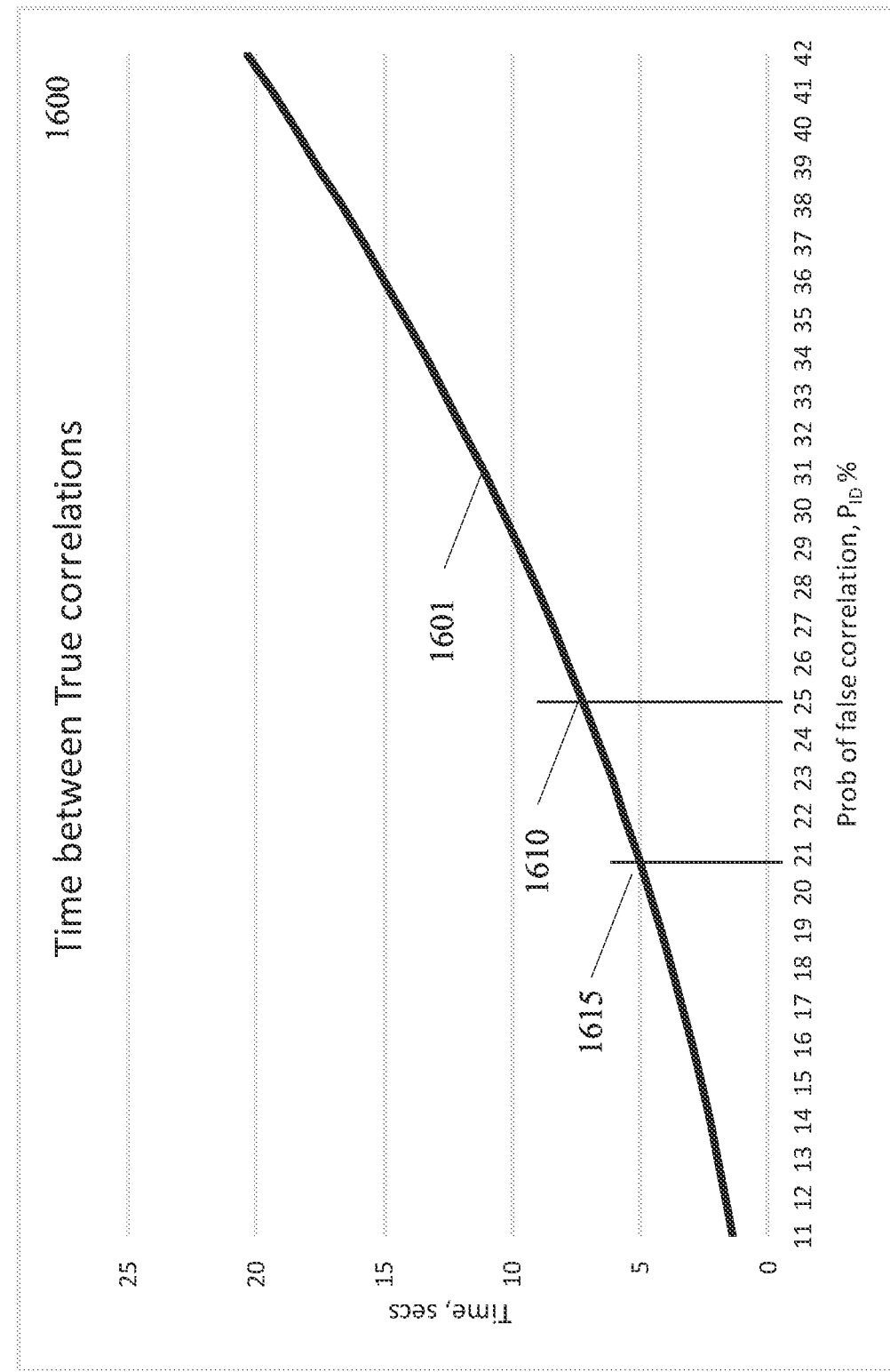
FIG. 16 is a graph of an example time between true detections of ID packets against the probability of false detection $P_{ID}$, according to some embodiments.

If two false IDs are detected, then the Master 910 will assume that a communication channel may be established and will transmit a number of Polls. If, for example, the Master 910 sends 100 polls before terminating the connection, then the total time "lost" is in the order of 1407.5 ms. For a chance, P, that the wanted ID were detected, there will be an average time gap of 1407.5/P seconds between true detections. Therefore, there is a playoff between sensitivity and the time gap between true detections. An acceptable time gap needs to be established, and hence a corresponding sensitivity. FIG. 16 is a graph 1600 of an example of the time between true detections of ID packets 1601 against the probability of false detection $P_{ID}$. For example, for a PID=25%, the average time between true detections is about 7.5 seconds 1610. For an average time of 5 seconds, $P_{ID}=21\%$ 1615. A $P_{ID}=21\%$ is a 79% probability that the wanted wins, which, with reference to FIG. 14 is a correlation threshold of 60% 1450 for laboratory noise (from FIG. 10, a sensitivity of −108 dBm) and a correlation threshold of 81% 1451 for suburban noise (from FIG. 12, a sensitivity of −101 dBm). With reference to FIG. 14, the 50% chance that ID packet correlates higher than laboratory noise is 50%, 1420 and the 50% chance that ID packet correlates higher than suburban noise is 71%, 1421. Hence, for an average of 5 seconds between true detections the correlation threshold is 10% higher than the threshold for 50% chance that ID packet correlates higher than noise, i.e., 60%-50%=81%-71%=10%.

The setting of the correlation threshold for the detection of the ID packets is therefore critical and, as shown above, it varies considerably with the background noise. To detect the two ID packets, on average, every 5 seconds, the correlation threshold may vary from 60% to 81% dependent upon laboratory or suburban noise. For example, if the threshold is set to 60% and the background noise is suburban, then noise will trigger the ID correlation threshold and the wanted ID packets will be effectively blocked. If the threshold is set too low, then the result is many false if not only false detections. If the threshold is too high, then the result may be no IDs are detected, false or true. If the threshold is too low and two false ID detections cause the Master 910 to set up a false communications channel, then it may send, say, 100 Poll packets, and, during each of the 100 reception windows Trw 990, only noise and not true Null packets may be correlated. If the Nulls are due only to noise, then the RTTs, as discussed above with reference to FIG. 9, will be random, whereas, if the Nulls are true Nulls, then the RTTs will tend to be similar.

An example method is disclosed that first determines if the correlated Nulls are true or false, and if false, i.e., due to noise, measure the correlation of the noise and use that to derive and set the correlation threshold to be used for the ID packet detection.

In one embodiment of this disclosure, a "binning" process is used to determine if the correlated Null packets are true or due to noise, i.e., was a correct communication channel set up? A brief description and analysis of binning follows.

The RTTs resulting from the maximum correlations in each reception window 990 are placed into B bins. Assuming a 50 μs reception window 990 and B=10 bins of, say, 5 μs width, then if all 100 nulls are due to noise, there will be an average of 10 RTTs in each bin, i.e., the mean probability that a noise RTT is in a particular 5 μs bin is 1/B, with a standard deviation of $$\sqrt{\left(\frac{1}{B} * \left(1 - \frac{1}{B}\right)\right)}.$$

If say 10% of the RTTs are from true Nulls, then there will be an average of 9 RTTs due to noise in each bin, and 9+10=19 RTTs in the "true" bin. The standard deviation for the noise is 0.3, hence for a worst case, assume 3 σ, there may be |9+3*9*0.3|=17 RTTs in the highest "noise" bin.

Figure 17:
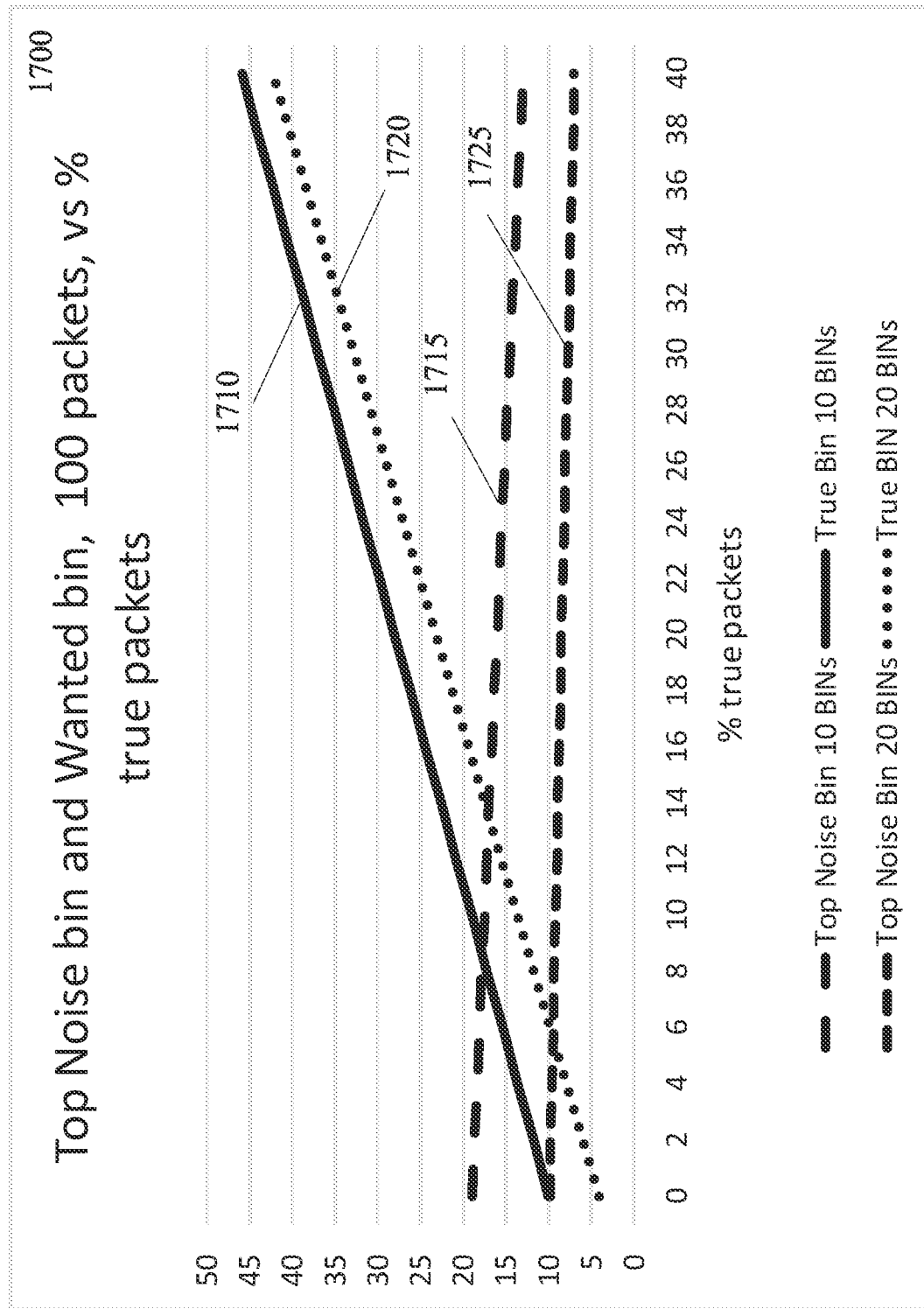
FIG. 17 is a graphical representation of an example maximum number of RTTs in a bin due to noise, and the mean number of RTTs in the "true bin" against the percentage of true RTTs, for 10 and 20 bins, according to some embodiments.
Figure 18:
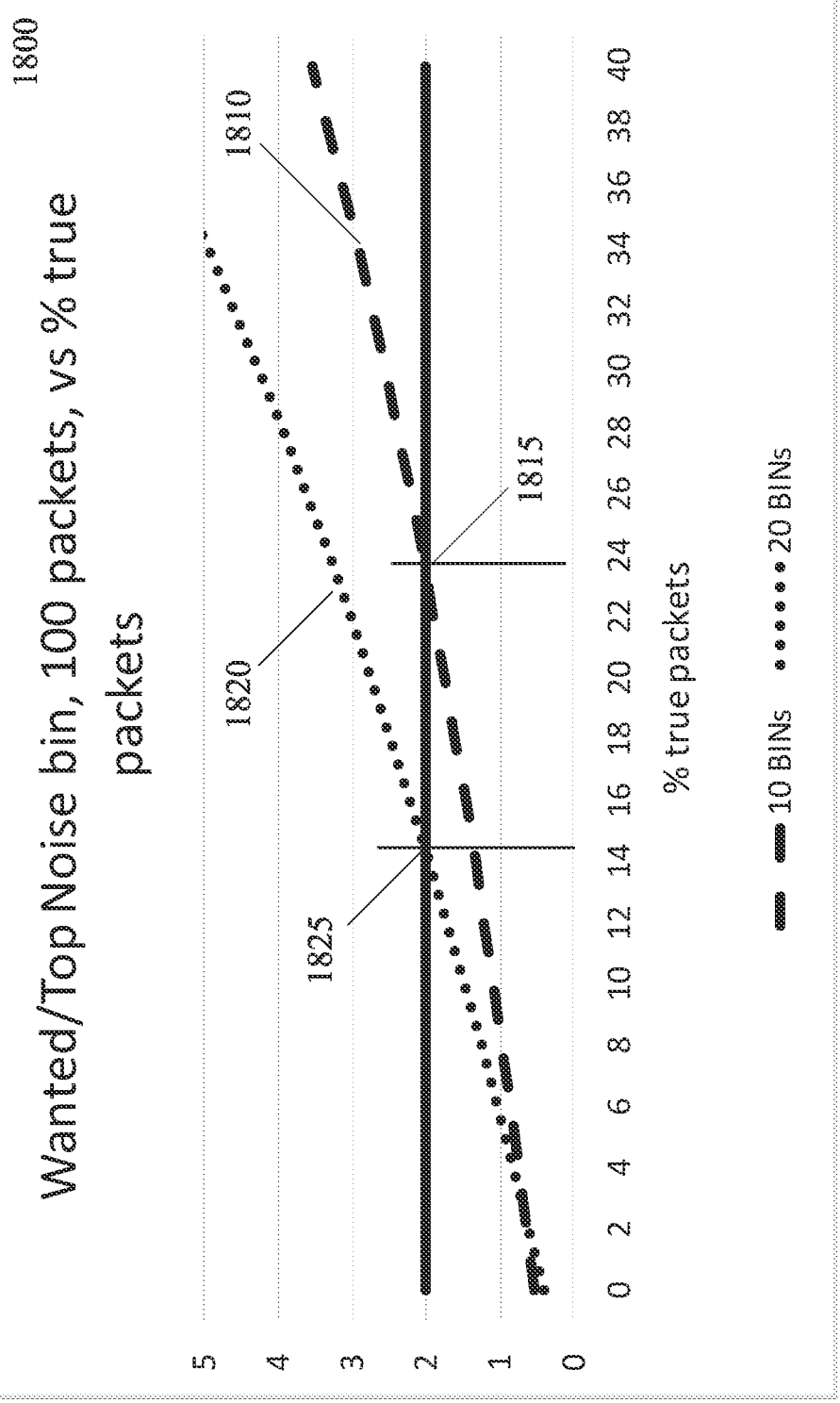
FIG. 18 is a graphical representation of an example ratio of the mean number of true RTTs in the true bin, to the number of RTTs in the top noise bin, for 10 and 20 bins, according to some embodiments.

FIG. 17 is a graphical representation 1700 of an example of the maximum number of RTTs in a bin due to noise, and the mean number of RTTs in the "true bin" against the percentage of true RTTs, for 10 and 20 bins. Plot 1710 is the value of the true bin when there are 10 bins, and plot 1715 is the corresponding value of the highest noise bin. Plot 1720 is the value of the true bin when there are 20 bins, and plot 1725 is the corresponding value of the highest noise bin. As the percentage of true RTTs increases, the value of the true bin becomes much larger than the top noise bin, indicating that true RTTs are present. FIG. 18 is a graphical representation 1800 of the ratio of the mean number of true RTTs in the true bin, to the number of RTTs in the top noise bin, for 10 and 20 bins. Plot 1810 is the ratio of the value of the true bin to the value of the top noise bin for 10 bins and plot 1820 is the ratio of the value of the true bin to the value of the top noise bin for 20 bins. Using, for example, a ratio of 2, for 10 bins this corresponds to there being 24% Nulls detected 1815. This decreases to 14% for 20 bins 1825. Binning may be used for two purposes: first, to determine that true Nulls are being received, and second to pre-filter the RTTs by only using the RTTs in the bin with the most RTTs, with the proviso that there are at least twice as many RTTs in the maximum bin to the next highest. Fixed bins should not be used as the true RTT is indeterminate, but the bins may be dynamically grouped by selecting, for example, RTTs that are within ±2.5 μs for 10 bins, and within ±1.25 μs for 20 bins, assuming a reception window 990 of 50 μs. Other values for the number of bins selected may be chosen and different ratios for the highest value bin to the next highest, may also be chosen. If the ratio for the highest value bin to the next highest does not meet the set threshold, e.g., 2, then it may be assumed that Null packets were not present, and the correlations were all due to noise.

If it is determined that the correlated Nulls are due to noise, then the mean of the maximum correlations in each reception window 990 can be used to effectively measure the background noise and hence derive a correlation threshold for the ID packets. The mean value of the noise peaks is the 2.9 σ noise correlation value as discussed above with reference to FIGS. 11 and 13, correlations 1030 and 1230. The Null packet has 126 bits compared to the ID packet of 68 bits so the mean of the maximum correlations is multiplied by $\sqrt{126/63}$ and then add a threshold margin, $Th_m$, for example 10%, such that the probability of the wanted winning is 79%, as discussed above with reference to FIGS. 14 and 16 such that the average time between true ID packets detections is 5 seconds. It may be noted that the average time between true ID packets detections may be varied by choosing different threshold margins, $Th_m$. A $Th_m$ value higher than 10% will theoretically reduce the average time from 5 seconds but decrease the sensitivity, and conversely, a $Th_m$ value lower than 10% may increase the average time but improve the sensitivity.

Figure 19:
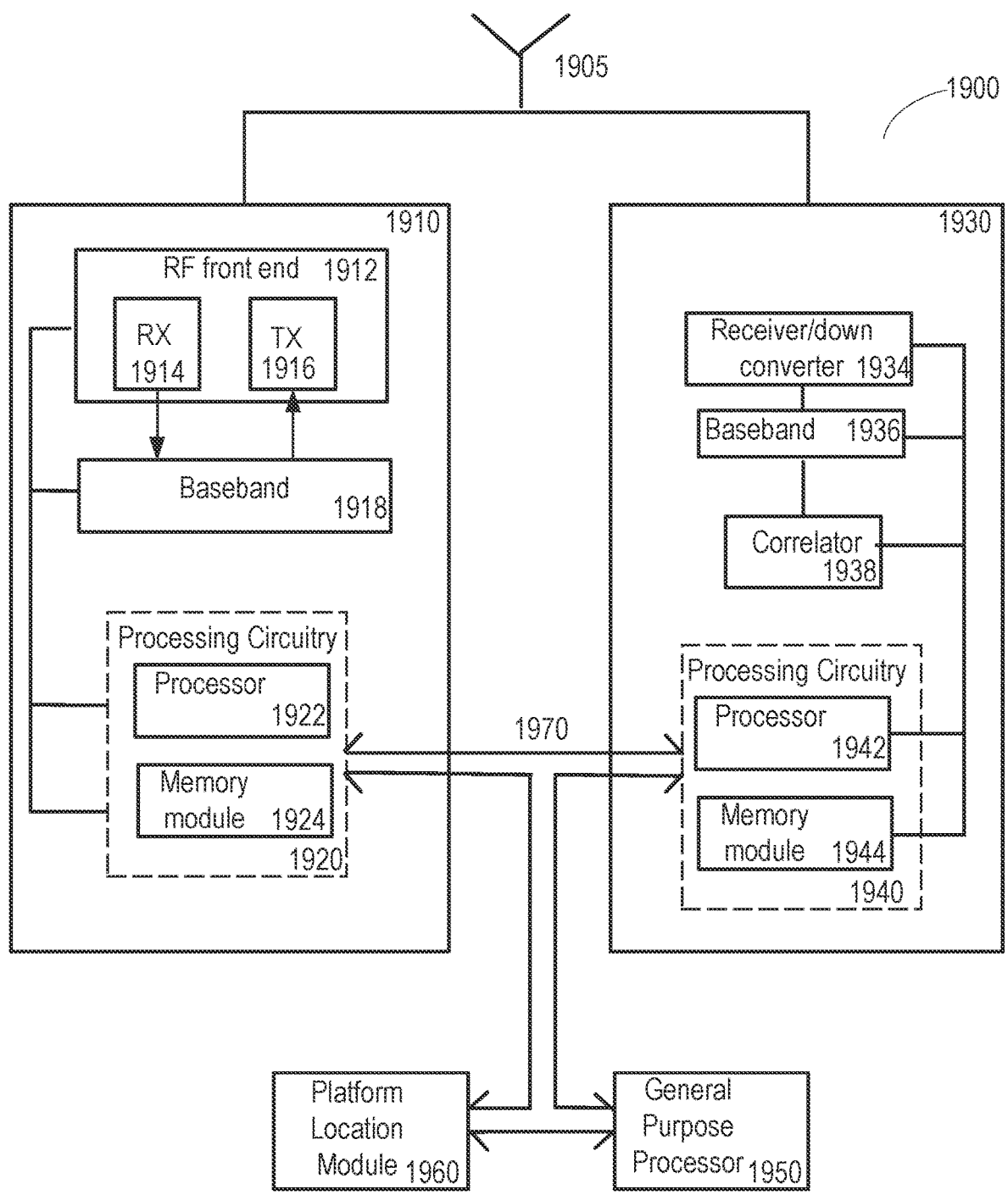
FIG. 19 illustrates a block diagram of an example wireless communication system which, according to an embodiment of the disclosure, may be configured to perform the functions described herein.

FIG. 19 illustrates a block diagram of an example wireless communication system 1900 which, according to an embodiment of the disclosure, may be configured to perform the functions described herein. The embodiment described herein is that where wireless communication system 1900 includes a wireless transmitter/receiver 1910 that may be configured to wirelessly receive signals and transmit signals, and may be configured to execute any of the methods of the Bluetooth Specification and a wireless receiver 1930 that performs the functions of a Bluetooth correlation receiver as discussed above with reference to FIGS. 10 to 13. Wireless communication system 1900 may perform the functions of the Master 910 as described herein. The wireless communications system 1900 also includes one or more wireless antennas such as wireless antenna 1905. The wireless communication system 1900 may also include a general purpose processor 1950 and a platform location module 1960 which are interconnected to the wireless transmitter/receiver 1910 and wireless receiver 1930 by a data bus 1970.

In some embodiments the wireless communications system 1900 includes wireless transmitter/receiver 1910. Wireless transmitter/receiver 1910 includes an RF front end 1912, which includes transmitter 1916 and receiver 1914, and baseband 1918. The transmitter 1916 may perform the functions of up conversion and amplification for the transmission of Bluetooth packets, received from baseband 1918, via the wireless antenna 1905. The receiver 1914 may perform the functions of low noise amplification, filtering and frequency down conversion for the reception of Bluetooth packets via the antenna (i.e., wireless antenna 1905) suitable for inputting to the baseband 1918. Baseband 1918 may perform the functions of modulation, de-modulating, whitening, de-whitening, coding, and de-coding as described in the Bluetooth Specification. In some embodiments, the processing circuitry 1920 and/or the processor 1922 may comprise integrated circuitry for processing and/or control, e.g., one or more processors and/or processor cores and/or Field Programmable Gate Arrays (FPGAs) and/or Application Specific Integrated Circuitry (ASICs) configured to execute programmatic software instructions. In some embodiments the some or all of the functions of the baseband 1918 may be performed by the processing circuitry 1920. The processing circuitry 1920 may be configured to control any of the methods and/or processes described herein and/or to cause such methods, and/or processes to be performed, e.g., by the baseband 1918 and the RF front end 1912. The memory module 1924 may be configured to store data, programmatic software code and/or other information described herein. In some embodiments, the software may include instructions that, when executed by the processing circuitry 1920, causes the processing circuitry 1920 to perform the processes described herein with respect to the wireless transmitter/receiver 1910.

In some embodiments, the wireless receiver 1930 includes a receiver/down converter 1934 and a baseband 1936, a correlator 1938, and processing circuitry 1940 that includes a processor 1942 and a memory module 1944, and one or more wireless antennas such as wireless antenna 1905. The receiver/down converter 1934 may perform the usual functions of an RF receiver front end such as low noise amplification, filtering and frequency down conversion so as to condition the received signal suitable for inputting to the baseband 1936. The baseband 1936 may perform the function of de-modulation of received signals suitable for inputting to the correlator 1938. The correlator 1938 may perform the function of correlation of the received signals with the expected wanted signals as discussed above with reference to FIGS. 10 to 13. Baseband 1936 does not perform the function of de-whitening the received signals. The correlator 1938 is correlating received packets that may have bit errors and de-whitening has the effect of increasing the number of bit errors. Hence, in the case that whitening has been applied to the wanted signal bit stream, i.e., in the case of Null packets, then the correlator 1938 uses the whitened version of the expected bit stream. In some embodiments the receiver/down converter 1934, the correlator 1938 and/or the processing circuitry 1940 may comprise integrated circuitry for processing and/or control, e.g., one or more processors and/or processor cores and/or FPGAs and/or ASICs configured to execute programmatic software instructions. In some embodiments the functions of the RF baseband 1936 and/or the correlator 1938 may be performed by the processing circuitry 1940. The processing circuitry 1940 may be configured to control any of the methods and/or processes described herein and/or to cause such methods, and/or processes to be performed, e.g., by the receiver/down converter 1934, the baseband 1936 and the correlator 1938. The memory module 1944 is configured to store data, programmatic software code and/or other information described herein. In some embodiments, the software may include instructions that, when executed by the processing circuitry 1940, causes the processing circuitry 1940 to perform the processes described herein with respect to the wireless receiver 1930.

According to an embodiment of the disclosure the wireless transmitter/receiver 1910 may be configured to transmit and receive signals and the processing circuitry 1920 may be configured to prepare the transmitted and received signal attributes based upon the Bluetooth Specification. According to this embodiment of the disclosure the wireless transmitter/receiver 1910, acting as Master 910, may be configured to transmit packets for the purpose of paging another device, in particular Slave 950, as discussed above with reference to FIGS. 6, 7, and 8 and packets transmitted for the purpose of maintaining communications with another device, in particular Slave 950. Such packets may include ID, FHS, and Poll packets that are to be transmitted and received by a wireless station that is based upon the Bluetooth Specification. The memory module 1924 may store instructions for executing any method mentioned in the specification, input signals, and results of processing of the processor 1922, signals to be outputted and the like.

According to another embodiment of the disclosure, the wireless receiver 1930 may be configured to receive the transmissions of another wireless communication device, i.e., Slave 950, and the processing circuitry 1940 may be configured to monitor an attribute of the other wireless communication device, i.e., Slave 950, and determine the value of the times of arrival, ToAs, of packets from the Slave 950. In addition, according to an embodiment of the disclosure the wireless receiver 1930 may be configured to record the times of departure ToD of the transmissions from the wireless transmitter receiver 1910. These times of departure may be accomplished by the wireless transmitter/receiver 1910 outputting a trigger that is timed to coincide with the transmission of ranging packets such as, with reference to FIG. 9, 920 or 921. In addition, according to an embodiment of the disclosure the wireless receiver 1930 may be configured to measure the times of arrival ToA of the response transmissions from the Slave 950, such as, with reference to FIG. 9, 961 or 962. In addition, according to an embodiment of the disclosure the wireless receiver 1930 may be configured to communicate to the wireless transmitter/receiver 1910, via the data bus 1970, the successful reception of transmissions from the Slave 950. Also, according to an embodiment of the disclosure, the wireless transmitter/receiver 1910 may be configured to communicate to the receiver 1930 the channel frequency that the response packet is expected to be received on. Hence, wireless communications system 1900, acting as Master 910, may page a Slave 950, set up a communications channel, exchange Poll and Null packets and then terminate the communications, even for the conditions where the response signals from the Slave 950 are at negative SNRs.

According to an embodiment of the disclosure, a general purpose processor 1950 may be used to control the operations of the wireless communication system 1900 and in particular the RF (i.e., wireless) transmitter/receiver 1910 and wireless receiver 1930. The general purpose processor 1950 may also carry out the various calculations as described in this disclosure and may also prepare the measurement results for disclosure to an operator or user. In some embodiments, the general purpose processor 1950 can be a computing device such as a tablet computer, desktop computer, laptop computer, or distributed computing, e.g., cloud computing. In some embodiments, the general purpose processor 1950 can be a processor/CPU in the tablet, laptop computer, desktop computer, or distributed computing environment, etc. In some embodiments the general purpose processor 1950 may comprise integrated circuitry for processing and/or control, e.g., one or more processors and/or processor cores and/or FPGAs and/or ASICs configured to execute programmatic software instructions and may include a memory module to execute programmatic code stored in the general purpose processor or another device. It is also noted that the elements of the wireless communications system 1900 can be included in a single physical device/housing or can be distributed among several different physical devices/housings. Processor 1950 may be used to perform the various calculations as described in this disclosure and may also prepare the measurement results for disclosure to an operator or user.

According to an embodiment of the disclosure, a platform location module 1960 may be used to input, via the data bus 1970, to the general purpose processor 1950 and/or the processing circuitry 1940 and/or 1920 the location of the platform that is carrying the wireless communication device 1900. The platform location module 1960 may comprise navigation equipment such as a GPS receiver and/or a gyro. The location of the wireless communication device 1900, together with the RTTs calculated from the ToAs and ToDs of packets exchanged with the Slave 950, may be used by the general purpose processor 1950 to calculate and display the location of the Slave 950. Geo-location of a device using the RTTs and location of the wireless communication device is known.

Figure 20:
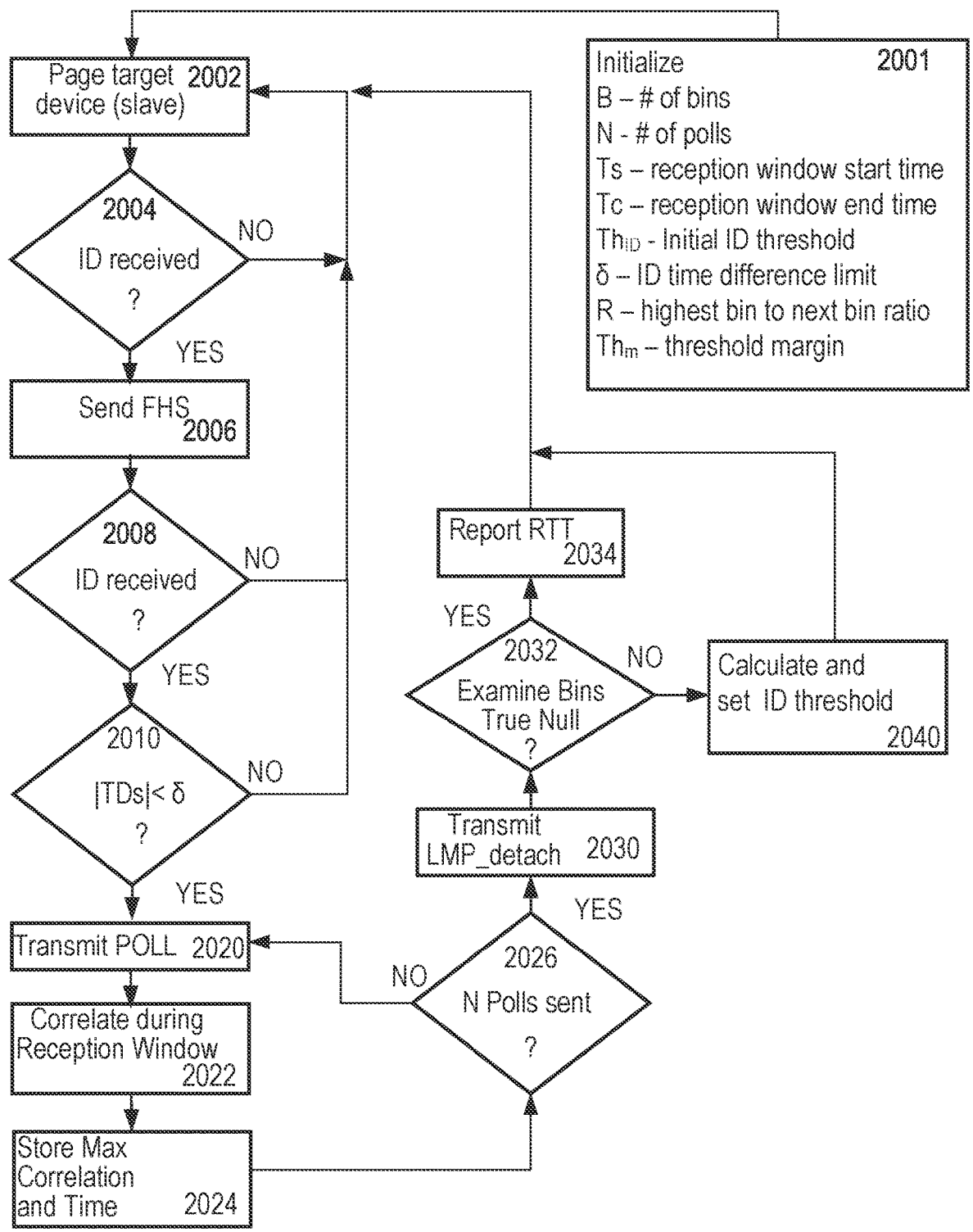
FIG. 20 is a flow diagram of an example process of one embodiment of the disclosure for determining the location of a Bluetooth® device.

FIG. 20 is a flow diagram of an example process 2000 of one embodiment of the disclosure for determining the location of a Bluetooth device. Process 2000 may start with step 2001 where initial values for a number of parameters may be set. Such parameters may include:

B, the number of bins as discussed above with reference to FIGS. 17 and 18,

N, the number of Poll packets sent by the Master 910 every time a communication channel is set up with the target, Slave 950, Ts and Tc, the start and end times, 991 and 992, respectively of the reception window Trw 990 as discussed above with reference to FIG. 9, $Th_{init}$ the initial ID correlation threshold value, δ, the allowable time difference between ID response packets, R, the required ratio of the highest RTT count in a bin and the count in the next highest bin, as discussed above with reference to FIG. 18, and $Th_m$ the correlation threshold margin.

These parameters may be entered via the general purpose processor 1950 and may be communicated to and stored in one or both of the processing circuitries 1920 and 1940. Some or all of these parameters may be pre-programmed.

At step 2002, the Master 910 may start paging the Slave 950 as discussed above with reference to FIGS. 6, 7 and 8. The paging ID packets may be transmitted by the transmitter/receiver 1910, acting as Master 910, and both wireless receivers 1914 and 1930 may listen for the ID response packet. The paging frequency channels may be calculated and selected by the processing circuitry 1920 and communicated to the receiver/down converter 1934, via the processing circuitry 1940, such that wireless receiver 1930 will hop to the correct paging channels. At step 2004 it is determined if an ID page response is received. Wireless transmitter/receiver 1910, sends a signal, via processing circuitries 1920 and 1940, to wireless receiver 1930 when an ID page transmission is sent (ToDp) and wireless receiver 1930 begins correlating the received bit stream with the known bit stream of the wanted ID response packet at a time Ts after the transmission of the ID page from wireless transmitter 1916. The received bit stream from the baseband 1936 is continuously correlated by correlator 1938 until time Tc has elapsed. The correlation threshold, IDTh, of the correlator 1938 is initially set to $Th_{init}$, i.e., correlation ID threshold ThID=$Th_{init}$. If the maximum correlation from correlator 1938 exceeds ThID, then the time of arrival, ToA1, of that peak is noted and the time difference, TD1, between the ToDp and ToA1 calculated and noted, and the process advances to step 2006. If the ID threshold is not exceeded, then the paging process, steps 2002 and 2004, continues. At step 2006 an FHS packet is transmitted to the Slave 950 as discussed above with reference to FIG. 6 step 3 603. The FHS packet is transmitted by wireless transmitter 1916 and a signal, corresponding to the time of departure, ToD2, is sent to wireless receiver 1930 via the processing circuitries 1920 and 1940. Similar to step 2004, wireless receiver 1930 begins correlating the received bit stream with the known bit stream of the wanted ID response packet at a time Ts after the transmission of the FHS packet from wireless transmitter 1916, until time Tc has elapsed. If the maximum correlation from correlator 1938 exceeds the ID threshold, ThID, then the time of arrival, ToA2, is noted and the time difference, TD2, between the ToD2 of the FHS packet, and ToA2 of the ID packet, calculated and noted, and the process advances to step 2010. If the maximum correlation from correlator 1938 does not exceed the ID threshold, then it is assumed that the ID detected in step 2004 was due to noise and the process returns to step 2002. At step 2010 the time differences TD1 and TD2 are compared and if they are within $\pm\delta$ µs, then the process advances to step 2020. If the time differences TD1 and TD2 are not within $\pm\delta$ µs, then it is assumed that at least one of the IDs at steps 2004 and 2008, was due to noise, and the process returns to step 2002. The measurement and comparison of the time differences TD1 and TD2 may be carried out by the processing circuitry 1940 in the wireless receiver 1930.

At step 2020 a Poll packet is transmitted on the communication channel as discussed above with reference to FIG. 6 step 5 605. The Poll packet may be transmitted by the wireless transmitter 1916 and a signal, corresponding to the time of departure ToDn of the Poll packet is sent to wireless receiver 1930 via the processing circuitries 1920 and 1940. The frequency of the hopping channel for the reception of the response ID packet is conveyed to the receiver/down converter 1934 in wireless receiver 1930 via the processing circuitries 1920 and 1940. Correlator 1938 in wireless receiver 1930 begins correlating the received bit stream with the known bit stream of the wanted ID response packet at a time Ts after the transmission of the FHS packet from wireless transmitter 1916, until time Tc has elapsed. The maximum correlation, Cmax, together with the corresponding ToAn of that maximum, may then be noted and at step 2024 the corresponding RTT may be recorded, RTT= (ToAn−ToDn−slot time)/2. The value of Cmax and the corresponding RTT may be stored in the memory module 1944 of the processing circuitry 1940. At step 2026 it is checked if N Polls have been transmitted and if not then the process returns to step 2020. Steps 2020, 2022, 2024, and 2026 continue until N polls have been transmitted and if yes, then at step 2030 an LMP_detach packet may be transmitted by the wireless transmitter 1916 to terminate the communication channel with the Slave 950.

At step 2032 the set of N RTTs may be grouped into bins as discussed above with reference to FIGS. 17 and 18. With B bins, set at step 2001, and a reception window Trw 990 equal to (Tc−Ts), which are also set at step 2001, the N RTTs may be grouped into bins of width Trw/B. The number of entries in each bin is then examined and if the bin with the highest number of entries is R times greater than the number of entries in the bin with the next highest number of entries, then it is assumed that the average RTT value in that bin is a true RTT corresponding to the location of the Slave 950, and that RTT is reported at step 2034 such that it may be used, together with the location of the wireless communications system 1900, as may be provided by the platform location module 1960, in the calculations for the location of the Slave 950. The binning process may take place in the processing circuitry 1940 and/or the general purpose processor 1950. If the bin with the highest number of entries is less than R times the number of entries in the bin with the next highest number of entries, then it is assumed that the RTTs are all due to noise and the process advances to step 2040.

At step 2040 the average, Cave, of the N maximum correlation values is first calculated, $$Cave = \frac{1}{N}\sum_{i=1}^{N} Cmax_i.$$

As discussed above, this represents the 2.9 σ noise correlation for Null packets. The equivalent 2.9 σ noise correlation for ID packets, $C_{ID}$ is then calculated, $C_{ID}$=Cave $\sqrt{128/68}$. As discussed above with reference to FIG. 14, the required correlation threshold for ID packets, IDTh, is IDTh=$C_{ID}$+$Th_m$. The threshold margin, $Th_m$ is entered at step 2001. The process then returns to step 2002 but the new calculated correlation threshold IDth is now used in the detection of the ID packets in steps 2004 and 2008. The calculations performed in step 2040 may be carried out in the processing circuitry 1940 and/or the general purpose processor 1950.

The process 2000 may continue until terminated by an operator via the general purpose processor 1950. Possible values for the parameters at step 2001 are: B=10, N=100, Ts=10 µs, Tc=60 µs, $Th_{ID}$=50%, δ=1 µs, R=2, and $Th_m$=10%. These values have been used in the various examples given above. Other values may be used. Choosing the initial ID correlation threshold, $Th_{ID}$ to be 50%, which, as discussed above with reference to FIG. 10, represents the threshold where there is a 50% chance that a noise peak correlation will exceed the wanted ID correlation for laboratory noise conditions, will probably result in false correlations of the ID packets at steps 2004 and 2008, and, as such result in a new ID correlation threshold IDTh being calculated at step 2040. This calculated ID correlation threshold IDTh is based upon the average of the measured peak noise correlations stored in step 2024, plus a threshold margin $Th_m$. As discussed above with reference to FIGS. 14, 15, and 16, the value of $Th_m$ effectively sets the average time between true correlations and also sets an effective sensitivity level. In order to determine if the correlations in steps 2020, 2022 and 2024 are due to Null packets or due to noise, a binning scheme may be used as discussed above with reference to FIGS. 17 and 18.

Other methods may be used to determine if the RTTs are true or not. For example, the N correlations across each reception window Trw 990, may be added and the sum peak determined. If the ratio of this sum peak value to the standard deviation is higher than a set amount, then the correlations can be declared as true. This PSR (peak to sigma ratio) technique is known. Other methods for determining that the correlations are not due to noise may be used. Different methods that use the high probability that true correlations will have RTTs that are close to each other, whereas noise correlations will be scattered across the reception window, may be used.

FIG. 21 is a flow diagram of an example process 2100 (i.e., a method) according to some embodiments of the present disclosure. 1. The method is implemented in a first wireless device (e.g., wireless communications system 1900, wireless transmitter/receiver 1910, wireless receiver 1930, etc.) for determining a plurality of round-trip times, RTT, corresponding to communication between the first wireless device a second wireless device (e.g., a Bluetooth device). One or more Blocks and/or functions and/or methods and/or steps performed by the first wireless device may be performed by one or more elements of the first wireless device, such as processing circuitry 1920 (and/or processor 1922 and/or memory module 1924) and/or RF front end 1912 and/or baseband 1918 and/or receiver/down converter 1934 and/or baseband 1936 and/or correlator 1938 and/or processing circuitry 1940 (and/or processor 1942 and/or memory module 1944) and/or platform location module 1960 and/or general purpose processor 1950, according to the example process/method. The method comprises transmitting, at step S2102, a plurality of paging requests to the second wireless device using a plurality of paging channels; receiving, at step S2104, a first plurality of bit streams on each paging channel; and performing, at step 2106, a first correlation, during a reception window, of each bit stream of the first plurality of bit streams on each paging channel with a first expected bit stream associated with the transmitted plurality of paging requests. At step S2108, when a correlation threshold is exceeded, at least one of the following is performed: transmitting a synchronization packet to the second wireless device; receiving a bit stream in response to the synchronization packet; and performing a second correlation, during the reception window, of the bit stream received in response to the synchronization packet with the first expected bit stream being associated with the transmitted synchronization packet.

At step 2110, when a third time difference between a first time difference associated with the first correlation and a second time difference associated with the second correlation is within a predetermined time difference range, at least one of the following is performed: transmitting a plurality of poll packets to the second wireless device on a channel defined in the synchronization packet; receiving a second plurality of bit streams; and performing a third correlation of each bit stream of the second plurality of bit streams with a second expected bit stream associated with transmitted plurality of poll packets. The method further includes determining, at step 2112, a correlation time of a maximum correlation value of each poll packet of the plurality of poll packets; and determining, at step 2114, the plurality of RTTs corresponding to the plurality of poll pockets. Each RTT of each poll packet is determined based at least in part on the corresponding correlation time and a time of departure of the corresponding poll packet.

In some embodiments, the method further includes determining the reception window, the determined reception window opening at a starting time, Ts, after each transmission from the first wireless device and closing at an ending time, Tc, after each transmission from the first wireless device.

In some other embodiments, the method further includes: determining a transmission time, ToDp, for each transmitted paging request; determining a reception time, ToAp, of a paging response, if the correlation threshold is exceeded when performing the first correlation; determining the first time difference, the determined first time difference being equal to ToAp−ToDp; determining a transmission time, ToDf, of the synchronization packet; determining a reception time, ToAf, of a synchronization packet response, if the correlation threshold is exceeded when performing the second correlation; and determining the second time difference, the determined second time difference being equal to ToAf−ToDf.

In one embodiment, the method further includes: determining and recording the maximum correlation value (e.g., Cmax) of each poll packet of the plurality of poll packets; and determining whether the plurality RTTs correspond to a reception of noise by examining the RTT of each poll packet. The method also includes, if the plurality RTTs correspond to a reception of noise, determining the correlation threshold, IDTh:

$$IDTh = Cave\sqrt{126/68} + Thm$$

where $Cave = \frac{1}{N}\sum_{i=1}^{N} Cmax_i$;

Cmax is the maximum correlation value; and

Thm is a threshold margin, the threshold margin being variable.

In another embodiment, the threshold margin is varied based on an average time between determinations that the plurality of RTTs do not correspond to the reception of noise and correspond to true Null packets.

In some embodiments, increasing the threshold margin causes a time between detections of the true Null packets to decrease, and a sensitivity of detecting the true Null packets to decrease; and decreasing the threshold margin causes the time between the detections of the true Null packets to increase, and the sensitivity of detecting the true Null packets to increase.

In some other embodiments, the method further includes sorting the plurality of RTTs into a plurality of time bins, B. A time width of each time bin of the plurality of time bins are (Tc−Ts)/B such that all RTTs within (Tc−Ts)/B of each other are in the same bin.

In one embodiment, the method further includes: counting the RTTs in each time bin of the plurality of time bins; determining a first count of RTTs, r1, in a time bin of the plurality of time bins with a highest count of RTTs; and determining a second count of RTTs, r2, in another time bin of the plurality of time bins with a next highest count of RTTs.

In another embodiment, the method further includes: determining a ratio r1/r2; comparing the ratio r1/r2 with a predetermined ratio threshold, R; and if the ratio r1/r2 is less than the predetermined ratio threshold, R, assuming that the plurality of RTTs correspond to a reception of noise.

In some embodiments, the method further includes: determining a first location of the first wireless device; and determining a second location of the second wireless device based at least in part on the determined first location and the determined the plurality of RTTs.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: methods to determine if the correlations are due to noise, the details of the reception window, the exchange and number of packets on the communications channel, using fixed or variable correlation thresholds, the time difference and details used for the comparison and assessment of the two ID response packets, the method used to determine if true Null packets are received on the communication channel, e.g., binning, PSR or other, and, if binning is used, the number of bins and the bin selection, and, if PSR is used, the peak to sigma ratio selected. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method implemented in a first wireless device for determining a plurality of round trip times (RTTs) corresponding to communication between the first wireless device a second wireless device, the method comprising:
   transmitting a plurality of paging requests to the second wireless device using a plurality of paging channels;
   receiving a first plurality of bit streams on each paging channel of the plurality of paging channels;
   performing a first correlation, during a reception window, of each bit stream of the first plurality of bit streams on each paging channel of the plurality of paging channels with a first expected bit stream associated with the transmitted plurality of paging requests;
   when a correlation threshold is exceeded:
      transmitting a synchronization packet to the second wireless device;
      receiving a bit stream in response to the synchronization packet; and
      performing a second correlation, during the reception window, of the bit stream received in response to the synchronization packet with the first expected bit stream being associated with the transmitted synchronization packet;
   when a third time difference between a first time difference associated with the first correlation and a second time difference associated with the second correlation is within a predetermined time difference range:
      transmitting a plurality of poll packets to the second wireless device on a channel defined in the synchronization packet;
      receiving a second plurality of bit streams; and
      performing a third correlation of each bit stream of the second plurality of bit streams with a second expected bit stream associated with transmitted plurality of poll packets;
   determining a correlation time of a maximum correlation value of each poll packet of the plurality of poll packets; and determining the plurality of RTTs corresponding to the plurality of poll pockets, each RTT of each poll packet of the plurality of poll packets being determined based at least in part on the corresponding correlation time and a time of departure of the corresponding poll packet.

2. The method of claim 1, wherein the method further includes:
determining the reception window, the determined reception window opening at a starting time (Ts) after each transmission from the first wireless device and closing at an ending time (Tc) after each transmission from the first wireless device.

3. The method of claim 1, wherein the method further includes:
determining a transmission time (ToDp) for each transmitted paging request;
determining a reception time (ToAp) of a paging response, if the correlation threshold is exceeded when performing the first correlation;
determining the first time difference, the determined first time difference being equal to ToAp−ToDp;
determining a transmission time (ToDf) of the synchronization packet;
determining a reception time (ToAf) of a synchronization packet response, if the correlation threshold is exceeded when performing the second correlation; and
determining the second time difference, the determined second time difference being equal to ToAf−ToDf.

4. The method of claim 1, wherein the method further includes:
determining and recording the maximum correlation value of each poll packet of the plurality of poll packets;
determining whether the plurality RTTs correspond to a reception of noise by examining the RTT of each poll packet of the plurality of poll packets; and
if the plurality RTTs correspond to the reception of noise:
determining the correlation threshold, IDTh:

$$IDTh = Cave\sqrt{126/68} + Thm$$

where $Cave = \frac{1}{N}\sum_{i=1}^{N} Cmax_i;$

Cmax is the maximum correlation value; and
Thm is a threshold margin, the threshold margin being variable.

5. The method of claim 4, wherein the threshold margin is varied based on an average time between determinations that the plurality of RTTs do not correspond to the reception of noise and correspond to true Null packets.

6. The method of claim 5, wherein:
increasing the threshold margin causes a time between detections of the true Null packets to decrease, and a sensitivity of detecting the true Null packets to decrease; and
decreasing the threshold margin causes the time between the detections of the true Null packets to increase, and the sensitivity of detecting the true Null packets to increase.

7. The method of claim 2, wherein the method further includes:
sorting the plurality of RTTs into a plurality of time bins (B), a time width of each time bin of the plurality of time bins being (Tc−Ts)/B such that all RTTs within (Tc−Ts)/B of each other are in the same bin.

8. The method of claim 7, wherein the method further includes:
counting the RTTs in each time bin of the plurality of time bins;
determining a first count of RTTs in a time bin of the plurality of time bins with a highest count of RTTs; and
determining a second count of RTTs in another time bin of the plurality of time bins with a next highest count of RTTs.

9. The method of claim 8, wherein the method further includes:
determining a ratio (r1/r2), r1 being the first count of RTTs, r2 being the second count of RTTs;
comparing the ratio r1/r2 with a predetermined ratio threshold (R); and
if the ratio r1/r2 is less than the predetermined ratio threshold R, assuming that the plurality of RTTs correspond to a reception of noise.

10. The method of claim 1, wherein the method further includes:
determining a first location of the first wireless device; and
determining a second location of the second wireless device based at least in part on the determined first location and the determined the plurality of RTTs.

11. A first wireless device configured for determining a plurality of round trip times (RTTs) corresponding to communication between the first wireless device and a second wireless device, the first wireless device comprising processing circuitry configured to:
cause the first wireless device to:
transmit a plurality of paging requests to the second wireless device using a plurality of paging channels;
receive a first plurality of bit streams on each paging channel of the plurality of paging channels;
perform a first correlation, during a reception window, of each bit stream of the first plurality of bit streams on each paging channel of the plurality of paging channels with a first expected bit stream associated with the transmitted plurality of paging requests;
when a correlation threshold is exceeded:
cause the first wireless device to:
transmit a synchronization packet to the second wireless device;
receive a bit streams in response to the synchronization packet; and
perform a second correlation, during the reception window, of the bit stream received in response to the synchronization packet with the first expected bit stream being associated with the transmitted synchronization packet;
when a third time difference between a first time difference associated with the first correlation and a second time difference associated with the second correlation is within a predetermined time difference range:
cause the first wireless device to:
transmit a plurality of poll packets to the second wireless device on a channel defined in the synchronization packet;
receive a second plurality of bit streams; and
perform a third correlation of each bit stream of the second plurality of bit streams with a second expected bit stream associated with transmitted plurality of poll packets; and determine a correlation time of a maximum correlation value of each poll packet of the plurality of poll packets; and determine the plurality of RTTs corresponding to the plurality of poll pockets, each RTT of each poll packet of the plurality of poll packets being determined based at least in part on the corresponding correlation time and a time of departure of the corresponding poll packet.

12. The first wireless device of claim 11, wherein the processing circuitry is further configured to:
determine the reception window, the determined reception window opening at a starting time (Ts) after each transmission from the first wireless device and closing at an ending time (Tc) after each transmission from the first wireless device.

13. The first wireless device of claim 11, wherein the processing circuitry is further configured to:
determine a transmission time (ToDp) for each transmitted paging request;
determine a reception time (ToAp) of a paging response, if the correlation threshold is exceeded when performing the first correlation;
determine the first time difference, the determined first time difference being equal to ToAp−ToDp;
determine a transmission time (ToDf) of the synchronization packet;
determine a reception time (ToAf) of a synchronization packet response, if the correlation threshold is exceeded when performing the second correlation; and
determine the second time difference, the determined second time difference being equal to ToAf−ToDf.

14. The first wireless device of claim 11, wherein the processing circuitry is further configured to:
determine and recording the maximum correlation value of each poll packet of the plurality of poll packets
determine whether the plurality RTTs correspond to a reception of noise by examining the RTT of each poll packet of the plurality of poll packets; and
if the plurality RTTs correspond to the reception of noise:
determine the correlation threshold, IDTh:

$$IDTh = Cave\sqrt{126/68} + Thm$$

where $Cave = \frac{1}{N}\sum_{i=1}^{N} Cmax_i;$

Cmax is the maximum correlation value; and
Thm is a threshold margin, the threshold margin being variable.

15. The first wireless device of claim 14, wherein the threshold margin is varied based on an average time between determinations that the plurality of RTTs do not correspond to the reception of noise and correspond to true Null packets.

16. The first wireless device of claim 15, wherein:
increasing the threshold margin causes a time between detections of the true Null packets to decrease, and a sensitivity of detecting the true Null packets to decrease; and
decreasing the threshold margin causes the time between the detections of the true Null packets to increase, and the sensitivity of detecting the true Null packets to increase.

17. The first wireless device of claim 12, wherein the processing circuitry is further configured to:
sort the plurality of RTTs into a plurality of time bins (B), a time width of each time bin of the plurality of time bins being (Tc−Ts)/B such that all RTTs within (Tc−Ts)/B of each other are in the same time bin.

18. The first wireless device of claim 17, wherein the processing circuitry is further configured to:
count the RTTs in each time bin of the plurality of time bins;
determine a first count of RTTs in a time bin of the plurality of time bins with a highest count of RTTs; and
determine a second count of RTTs in another time bin of the plurality of time bins with a next highest count of RTTs.

19. The first wireless device of claim 18, wherein the processing circuitry is further configured to:
determine a ratio (r1/r2), r1 being the first count of RTTs, r2 being the second count of RTTs;
compare the ratio r1/r2 with a predetermined ratio threshold (R); and
if the ratio r1/r2 is less than the predetermined ratio threshold R, assume that the plurality of RTTs correspond to a reception of noise.

20. A system comprising a first wireless device configured for determining a plurality of round trip times (RTTs) corresponding to communication between the first wireless device a second wireless device, the first wireless device comprising processing circuitry configured to:
cause the first wireless device to:
transmit a plurality of paging requests to the second wireless device using a plurality of paging channels;
receive a first plurality of bit streams on each paging channel of the plurality of paging channels;
perform a first correlation, during a reception window, of each bit stream of the first plurality of bit streams on each paging channel of the plurality of paging channels with a first expected bit stream associated with the transmitted plurality of paging requests;
when a correlation threshold is exceeded:
cause the first wireless device to:
transmit a synchronization packet to the second wireless device;
receive a of bit streams in response to the synchronization packet; and
perform a second correlation, during the reception window, of the bit stream received in response to the synchronization packet with the first expected bit stream being associated with the transmitted synchronization packet;
when a third time difference between a first time difference associated with the first correlation and a second time difference associated with the second correlation is within a predetermined time difference range:
cause the first wireless device to:
transmit a plurality of poll packets to the second wireless device on a channel defined in the synchronization packet;
receive a second plurality of bit streams; and
perform a third correlation of each bit stream of the second plurality of bit streams with a second expected bit stream associated with transmitted plurality of poll packets; and
determine a correlation time of a maximum correlation value of each poll packet of the plurality of poll packets;
determine the plurality of RTTs corresponding to the plurality of poll pockets, each RTT of each poll packet of the plurality of poll packets being determined based at least in part on the corresponding correlation time and a time of departure of the corresponding poll packet;

determine a first location of the first wireless device; and determine a second location of the second wireless device based at least in part on the determined first location and the determined the plurality of RTTs.

* * * * *